(12) United States Patent
Vishnoi et al.

(10) Patent No.: US 12,169,763 B2
(45) Date of Patent: Dec. 17, 2024

(54) FAST AND SCALABLE MULTI-TENANT SERVE POOL FOR CHATBOTS

(71) Applicant: Oracle International Corporation, Redwood Shores, CA (US)

(72) Inventors: Vishal Vishnoi, Redwood Shores, CA (US); Suman Mallapura Somasundar, Sunnyvale, CA (US); Xin Xu, San Jose, CA (US); Stevan Malesevic, Glen Ellyn, IL (US)

(73) Assignee: Oracle International Corporation, Redwood Shores, CA (US)

( * ) Notice: Subject to any disclaimer, the term of this patent is extended or adjusted under 35 U.S.C. 154(b) by 810 days.

(21) Appl. No.: 17/229,228

(22) Filed: Apr. 13, 2021

(65) Prior Publication Data

US 2021/0319347 A1 Oct. 14, 2021

Related U.S. Application Data

(60) Provisional application No. 63/139,723, filed on Jan. 20, 2021, provisional application No. 63/009,118, filed on Apr. 13, 2020.

(51) Int. Cl.
*G06N 20/00* (2019.01)
*G06F 11/34* (2006.01)
(Continued)

(52) U.S. Cl.
CPC ......... *G06N 20/00* (2019.01); *G06F 11/3409* (2013.01); *G06F 16/2471* (2019.01); *G06N 5/043* (2013.01); *H04L 51/02* (2013.01)

(58) Field of Classification Search
CPC .......... G06N 20/00; G06N 5/043; G06N 3/04; G06N 3/08; G06N 3/063; G06F 16/2471; G06F 11/34049; H04L 51/02
See application file for complete search history.

(56) References Cited

U.S. PATENT DOCUMENTS 10,832,659 B2    11/2020   Ho et al.
10,860,629 B1 *  12/2020   Gangadharaiah ...... G06N 20/00
(Continued)

OTHER PUBLICATIONS

"Load Balancer", F5, 2019, 1 page.
U.S. Appl. No. 17/229,224 , "Non-Final Office Action", Sep. 4, 2024, 29 pages.

*Primary Examiner* — Kamran Afshar
*Assistant Examiner* — Brian J Hales
(74) *Attorney, Agent, or Firm* — Kilpatrick Townsend & Stockton LLP

(57) ABSTRACT

Techniques are disclosed for providing a scalable multi-tenant serve pool for chatbot systems. A query serving system (QSS) receives a request to serve a query for a skillbot. The QSS includes: (i) a plurality of deployments in a serving pool, and (ii) a plurality of deployments in a free pool. The QSS determines whether a first deployment from the plurality of deployments in the serving pool can serve the query based on an identifier of the skillbot. In response to determining that the first deployment cannot serve the query, the QSS selects a second deployment from the plurality of deployments in the free pool to be assigned to the skillbot, and loads a machine-learning model associated with the skillbot into the second deployment, wherein the machine-learning model is trained to serve the query for the skillbot. The query is served using the machine-learning model loaded into the second deployment.

18 Claims, 12 Drawing Sheets

(51) Int. Cl.
*G06F 16/2458* (2019.01)
*G06N 5/043* (2023.01)
*H04L 51/02* (2022.01)

(56) References Cited

U.S. PATENT DOCUMENTS

| | | |
|---|---|---|
| 11,394,667 B2 | 7/2022 | Bobbarjung et al. |
| 11,880,749 B2 | 1/2024 | Deshpande et al. |
| 2019/0042321 A1 | 2/2019 | Venkatesh et al. |
| 2021/0150150 A1* | 5/2021 | Wu .................... G06N 3/045 |

* cited by examiner

FAST AND SCALABLE MULTI-TENANT SERVE POOL FOR CHATBOTS

CROSS-REFERENCES TO RELATED APPLICATIONS

This application is a non-provisional of and claims the benefit of the filing date of the following provisional applications: (1) U.S. Provisional Application No. 63/009,118, filed on Apr. 13, 2020, and (2) U.S. Provisional Application No. 63/139,723, filed on Jan. 20, 2021. The above-referenced provisional applications are incorporated herein by reference in their entirety for all purposes.

FIELD OF THE INVENTION

The present disclosure generally relates to chatbot systems, and more particularly, to providing a fast, efficient, and scalable multi-tenant serve pool for chatbot systems.

BACKGROUND

Many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience.

A chatbot system includes a variety of chatbots, each of which is directed to a specific task. Each of the chatbots is implemented via a corresponding machine-learning model. The chatbot system allocates a container (i.e., a computing unit) to host the machine learning model associated with the chatbot. In a conventional chatbot system, the creation of a new container typically takes time in the order of a few tens of seconds. When a runtime query from an end user requesting a chatbot needs to be served and the container is not created or initialized, the system must create a new container to start a serving process i.e., utilize the machine-learning model that implements the chatbot to process user queries directed to the chatbot. However, the amount of time taken to create the container in the conventional chatbot systems is very high. Thus, the query is likely to fail due to a timeout. This leads to a poor user experience, which can turn the user away from using the chatbot system.

Embodiments described herein address these and other problems, individually and collectively.

SUMMARY

Techniques are disclosed (e.g., a method, a system, non-transitory computer-readable medium storing code or instructions executable by one or more processors) for providing a fast, efficient, and scalable multi-tenant serve pool for chatbot systems. Various embodiments are described herein, including methods, systems, non-transitory computer-readable storage media storing programs, code, or instructions executable by one or more processors, and the like.

By one aspect of the present disclosure, there is provided a method performed by a query serving system for providing a multi-tenant serve pool for chatbot systems. The query serving system receives a request to serve a query for a skillbot. The query serving system comprises: (i) a plurality of deployments in a serving pool, and (ii) a plurality of deployments in a free pool. A determination is made by the query serving system, whether a first deployment from the plurality of deployments in the serving pool can serve the query based on an identifier of the skillbot. Responsive to determining that the first deployment cannot serve the query, the query serving system selects a second deployment from the plurality of deployments in the free pool to be assigned to the skillbot, and loads a machine-learning model associated with the skillbot into the second deployment, wherein the machine-learning model is trained to serve the query for the skillbot. The query serving system serves the query using the machine-learning model loaded into the second deployment.

By one aspect of the present disclosure, there is provided a computing device comprising one or more data processors and a non-transitory computer readable storage medium containing instructions. The instructions when executed cause the one or more data processors to perform part or all of the one or more methods described herein.

By another aspect of the present disclosure, there is provided a computer-program product tangibly embodied in a non-transitory machine-readable storage medium, which includes instructions configured to cause one or more data processors to perform all or part of the one or more methods described herein.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

INTRODUCTION

Figure 1:
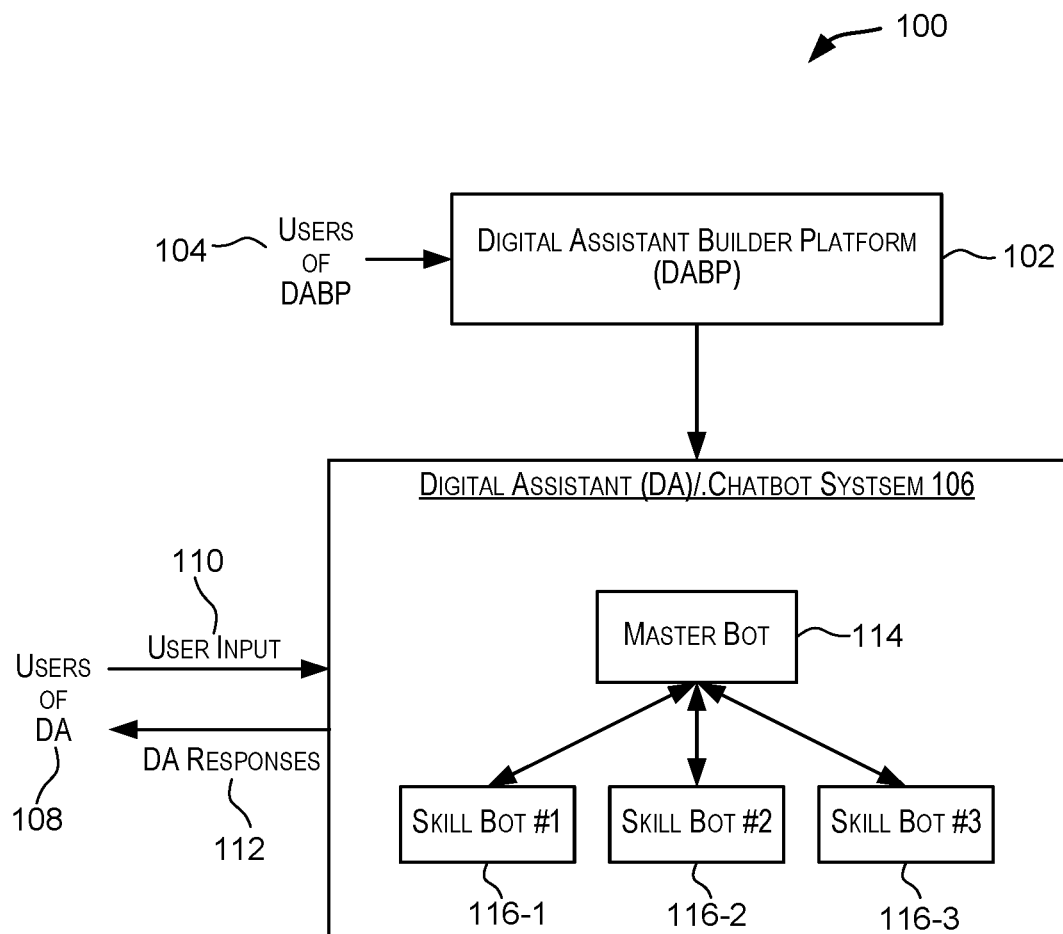
FIG. 1 is a simplified block diagram of a distributed environment incorporating an exemplary embodiment.

The present disclosure relates to chatbot systems, and more particularly, to techniques for providing a fast and scalable multi-tenant serve pool for chatbot systems. For a chatbot infrastructure system (e.g., a digital assistant builder platform (DABP) 102 as depicted in FIG. 1), servicing multiple tenants in a multi-tenant environment having potentially hundreds (if not thousands) of customers, efficient use of resources, such as hardware resources, available to the chatbot infrastructure is essential.

It is important that the hardware architecture of the chatbot infrastructure be used efficiently. Note that the terms 'chatbot' or 'skillbot' correspond to an interactive bot that helps users accomplish a variety of tasks in natural language conversations. These terms are used interchangeably in the remainder of the disclosure. Moreover, the terms 'machine-learning model' or 'bot model' refer to a model associated with a skillbot, and which implements the skillbot. These terms are also used interchangeably in the remainder of the disclosure. In a multi-tenant environment having for example, 20,000 customers, even if each customer has only one skillbot, this will cause the chatbot infrastructure system to simultaneously execute at least 20,000 containers, each container hosting a machine-learning model associated with a skillbot. This creates a significant drain on resources available to the chatbot infrastructure system. The situation is even further aggravated if customers have multiple bots, which is quite typical. In such an environment, the skillbots and associated bot models (i.e., the machine-learning model that is used to implement the skillbot) have to be served very efficiently, while satisfying timing requirements and constraints. For example, when an initial request is received for a trained bot model, the corresponding model has to be served at most, within a couple of seconds e.g., one or two seconds at most. Another issue is when to decide to stop serving a particular model (e.g., to kill a container because the associated skillbot has not been accessed or used in a certain time period). Embodiments described herein address these and other problems, individually and collectively.

When a skillbot is created and trained, a new model associated with the skillbot is generated. To use this model (e.g., to serve a query), the chatbot infrastructure system (e.g., DABP 102 in FIG. 1) starts a serving container in which the model is downloaded to (e.g., from an object store) and starts a serving process. The system may have another container (e.g., a model manager container) that is responsible for downloading the model from the object store (to the serving container) as well as checking and downloading newer versions of the model whenever they are available for the created skillbot. A deployment or a pod is defined herein as a super-container that includes the serving container and the model manager container. In other words, a deployment/pod is a group of one or more containers, with shared storage and network resources. In a conventional chatbot system, the creation of a new deployment including the serving container and the model manager container typically takes time in the order of a few tens of seconds e.g., anywhere from 80 to 90 seconds. When a runtime query from an end user requesting a skillbot needs to be served and the deployment is not ready, the system creates a new deployment and starts serving the query i.e., executes the model to obtain a result corresponding to the query. However, since it takes 80-90 seconds in a typical chatbot system, the query is likely to fail due to timeout and throw an error to the end user.

According to certain embodiments described herein, techniques are provided that can cut down the query time for a request for a new skillbot to a much reduced time, i.e., in order of a few second (e.g., 8 to 10 seconds), which prevents the query from failing due to timeout. To do this, a query serving system creates a pool of deployments at start-up (hereafter referred to as a free pool). All of the deployments in the free pool have both the serving and model-manager containers up and ready, but the serving process does not yet have any machine-learning model loaded. When a request to serve a query for a new skillbot is received, the query serving system selects one deployment from the free pool, and the respective model manager downloads the machine-learning model (associated with the skillbot) from an object store. As soon as the model manager downloads the machine-learning model, the serving container loads the machine-learning model and is ready to serve the query.

In certain embodiments, configurable options are provided such as a configurable maximum pool size of a serving pool (i.e., a pool of deployments being used to serve user queries), or a free pool size, which can be configured based on the capacity available for the query serving system. The query serving system ensures that it has sufficient capacity available in the free pool so that new query requests can be served immediately.

In certain embodiments, each serving container within a deployment hosts multiple skillbots i.e., the serving container includes multiple sub-containers, each of which is configured to host a machine-learning model associated with a skillbot. In other words, the serving container of each deployment is a tightly packed configuration of multiple machine-learning models. It is appreciated that the number of deployments, and the number of skillbots within each deployment are predetermined based on a capacity of the chatbot infrastructure system. Additionally, the query serving system updates the pool of deployments on a periodic basis to ensure that sufficient capacity is available so that requests for new skillbots can be served immediately.

Bot System

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides the text as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user input 108 may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (using NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using natural language generation (NLG) techniques. Thus, the natural language processing (NLP) performed by a digital assistant can include a combination of NLU and NLG processing. The NLU processing performed by a digital assistant, such as digital assistant 106, can include various NLU related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford NLP Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications (e.g., an instant messaging application), and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or provided using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102, e.g., through a user interface provided by DABP 102 for registering the skill bot with the digital assistant. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistant developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot.

Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 can provide a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 creates a skill bot from scratch using tools and services offered by DABP 102.

In certain embodiments, at a high level, creating or customizing a skill bot involves the following steps:
(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot
Each of the above steps is briefly described below.

(1) Configuring settings for a new skill bot-Various settings may be configured for the skill bot. For example, a skill bot designer can specify one or more invocation names for the skill bot being created. These invocation names, which serve as identifiers for the skill bot, can then be used by users of a digital assistant to explicitly invoke the skill bot. For example, a user can include an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine (e.g., a rules-based or machine-learning based classifier executed by the skill bot), which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities can be added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot-A skill bot is configured to receive user input in the form of utterances, parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. Q&A intents are created in a similar manner as regular intents. The dialog flow for Q&A intents can be different from that for regular intents. For example, unlike regular intents, the dialog flow for a Q&A intent may not involve prompts for soliciting additional information (e.g., the value for a particular entity) from the user.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, and how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:
  (a) a context section
  (b) a default transitions section
  (c) a states section Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section-A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states section. For example, there might be times when it is desirable to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, the states section in the dialog flow definition of the first skill can be configured to initiate an interaction with the second different skill in the same digital assistant and then return to the original dialog flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot-DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) Unresolved Intent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (using the trained model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Multi-Tenant Serve Pool Architectures

Figure 2:
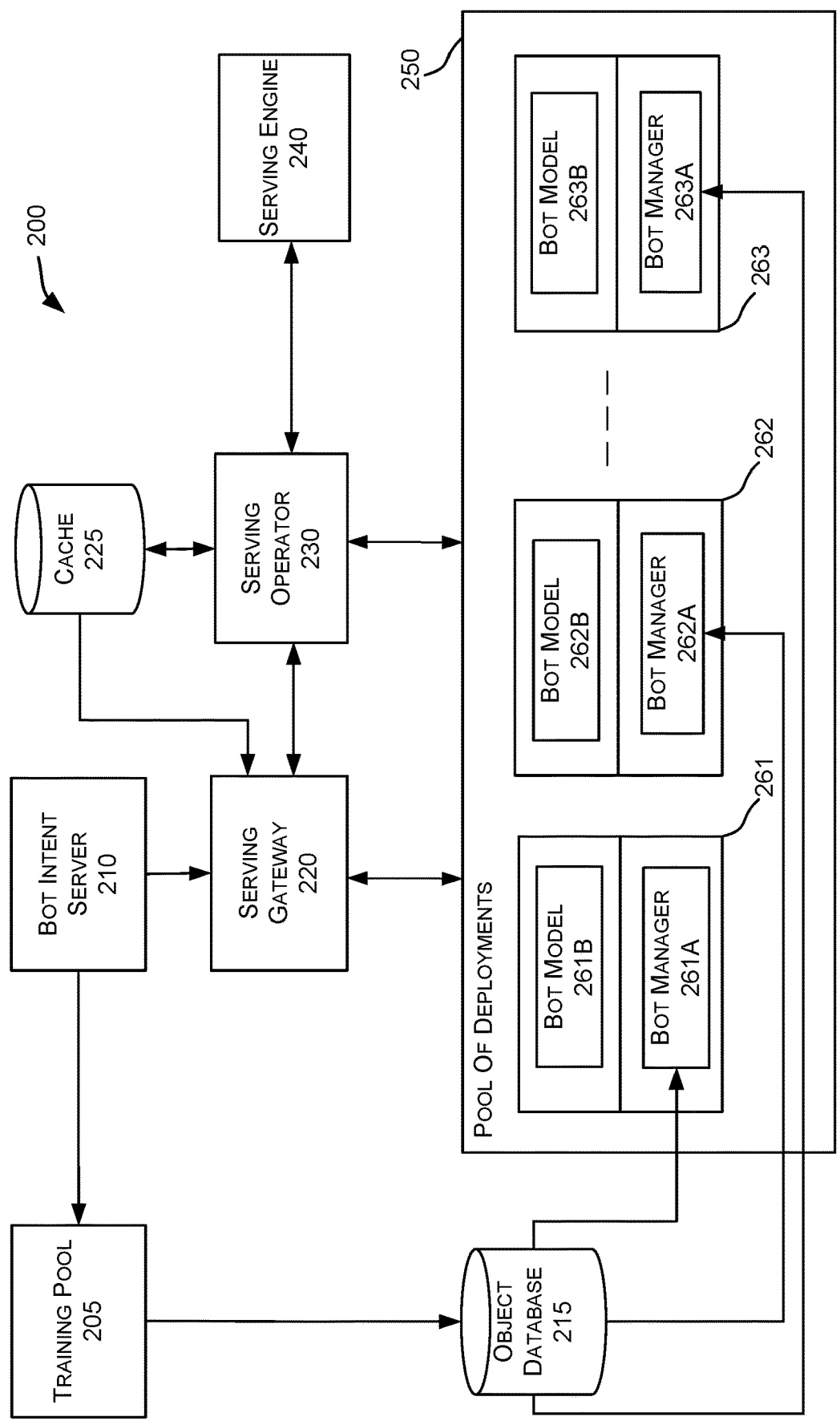
FIG. 2 depicts an exemplary query serving system in accordance with various embodiments.

FIG. 2 depicts an exemplary query serving system in accordance with various embodiments. As shown in FIG. 2, the query serving system 200 includes a training pool 205, a bot intent server 210, an object database 215, a serving gateway 220, a cache 225, a serving operator 230, a serving engine 240, and a pool of deployments (also referred to herein as a pool of pods) 250. The pool of deployments 250 includes a plurality of deployments 261, 262, and 263, respectively. Each deployment of the pool of deployments 250 is configured to host a machine-learning model associated with a skillbot. Specifically, each deployment (e.g., deployment 261) includes a serving container and a model manager container. The model manager container hosts a bot manager (also referred to herein as a model manager) 261A that is configured to load the machine-learning model 261B (i.e., a bot model) associated with the chatbot/skillbot in the serving container. The model manager 261A downloads the machine-learning model associated with the skillbot from the object database 215, as well as checks and downloads newer versions of the machine-learning model whenever they are available so that the machine-learning model may be used to serve a query (issued by a user) targeted to the skillbot.

When new skillsbots are created, the query serving system 200 trains models associated with each skillbot and maintains a list of models in the training pool 205 i.e., the machine-learning models are trained to serve queries related to the respective skillbots. Upon completion of training of a model, the trained model is stored in the object database 215.

At runtime, the bot intent server 210 receives a request to serve a query associated with a skillbot. The bot intent server 210, forwards the query to the serving gateway 220. The serving gateway 220 queries the cache 225 to determine, whether the model associated with the skillbot has already been deployed in one of the deployments of the pool of deployments 250. For instance, the cache 225 maintains a directory of deployments and and an identifier (ID) of a skillbot associated with each deployment. The serving gateway 220 utilizes the cache 225 to determine whether a particular skillbot (e.g., the skillbot to be utilized for processing the query) is being served by a deployment e.g., by matching an ID of the requested skillbot to IDs maintained in the cache 215. If the skillbot to be used to process the query is being served by a deployment, the serving gateway 220 forwards the query to the respective deployment, so that the model (already loaded in the serving container of the deployment) associated with the skillbot can be used to address the query. Thereafter, the serving gateway 220 receives a response associated with the query and returns the response to the intent server 210, to be forwarded to the user.

However, if the serving gateway 220 determines that the particular skillbot is currently not served by any deployment in the pool of deployments 250, the serving gateway 220 transmits a service request to the serving operator 230. In turn, the serving operator 230 generates and transmits a new deployment request to the serving engine 240. According to some embodiments, the serving engine 240 is configured to create a deployment for the skillbot. Upon creation of the deployment, the service engine 240 transmits an acknowledgement to the serving operator 230. The serving operator 230 instructs the bot manager of the newly instantiated deployment to download a model (from the object database 215) associated with the skillbot so that the model can be utilized for serving input queries. Thereafter, the serving operator 230 informs the serving gateway 220 of the availability of the newly instantiated skillbot, where after the serving gateway 220 forwards the input query to the newly instantiated skillbot for further processing. Additionally, the serving operator 230 updates the cache 225 to reflect the instantiation of the new skillbot within the pool of deployments 250, so that future queries (targeted to the skillbot) can be directly handled by the serving gateway 220. Details regarding the operation of the serving operator 230 and the management of the pool of deployments 250 are described herein with reference to FIG. 4. Furthermore, by some embodiments, the query corresponds to an utterance input by a user. The serving of the query by the query serving system corresponds to utilizing the machine-learning model to process the query e.g., the machine-learning model can be a classification model that classifies the utterance based on intents associated with the skillbot. The skillbot outputs an inferred intent for the utterance based on the classification.

Figure 3:
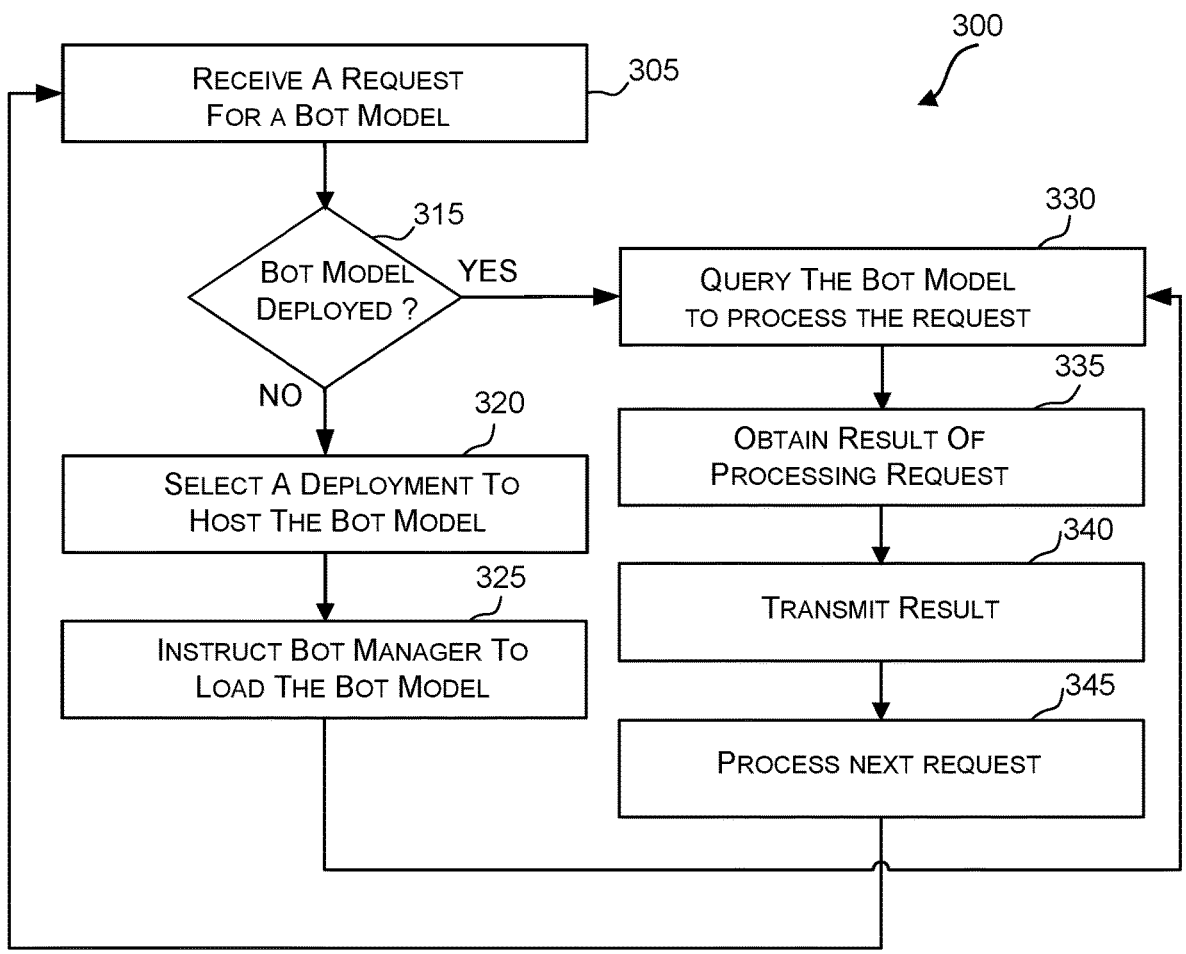
FIG. 3 depicts a flowchart illustrating a process performed by the query serving system of FIG. 2 in accordance with various embodiments.

FIG. 3 depicts a flowchart 300 depicting a process performed by the query serving system of FIG. 2 according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 3 may be performed by the query serving system 200 depicted in FIG. 2.

The process commences in step 305, wherein the query serving system receives a request for a bot model i.e., the intent server of the query serving system receives a request to serve a query with regard to a skillbot. In some embodiments, the received request is forwarded to a serving gateway of the query serving system. In step 315, the serving gateway performs a query to determine whether the skillbot is already deployed in one of the deployments of the pool of deployments. For instance, the serving gateway references a directory of deployments (stored in a cache) to verify whether an identifier of the skillbot is associated with a deployment. If the response to the query is affirmative, the process moves to step 330. However, if the response to the query is negative, the process moves to step 320.

In step 320 (i.e., when the skillbot is not being served by any deployment), the serving gateway of the query serving system transmits a request to the serving operator of the query serving system to instantiate a new deployment to host a model associated with the skillbot. In turn, the serving operator selects a new deployment from a free pool of deployments to host the model associated with the skillbot. Details regarding the operation of the serving operator with respect to the selection of the new deployment are described herein with reference to FIG. 4. Upon the new deployment being selected, in step 325, the serving operator instructs the bot manager (associated with the new deployment) to load the model associated with the skillbot. Thereafter the process moves to step 330.

In step 330, the query serving system utilizes the model to process the request i.e., the serving container of the deployment serves the request by executing the model associated with the skillbot. In step 335, the serving gateway obtains results related to the processing of the request. In step 340, the serving gateway transmits the obtained results to the intent server. Upon completion of processing the request, the process moves to step 345, wherein the query serving system proceeds to process the next request i.e., the process loops back to step 305.

Figure 4:
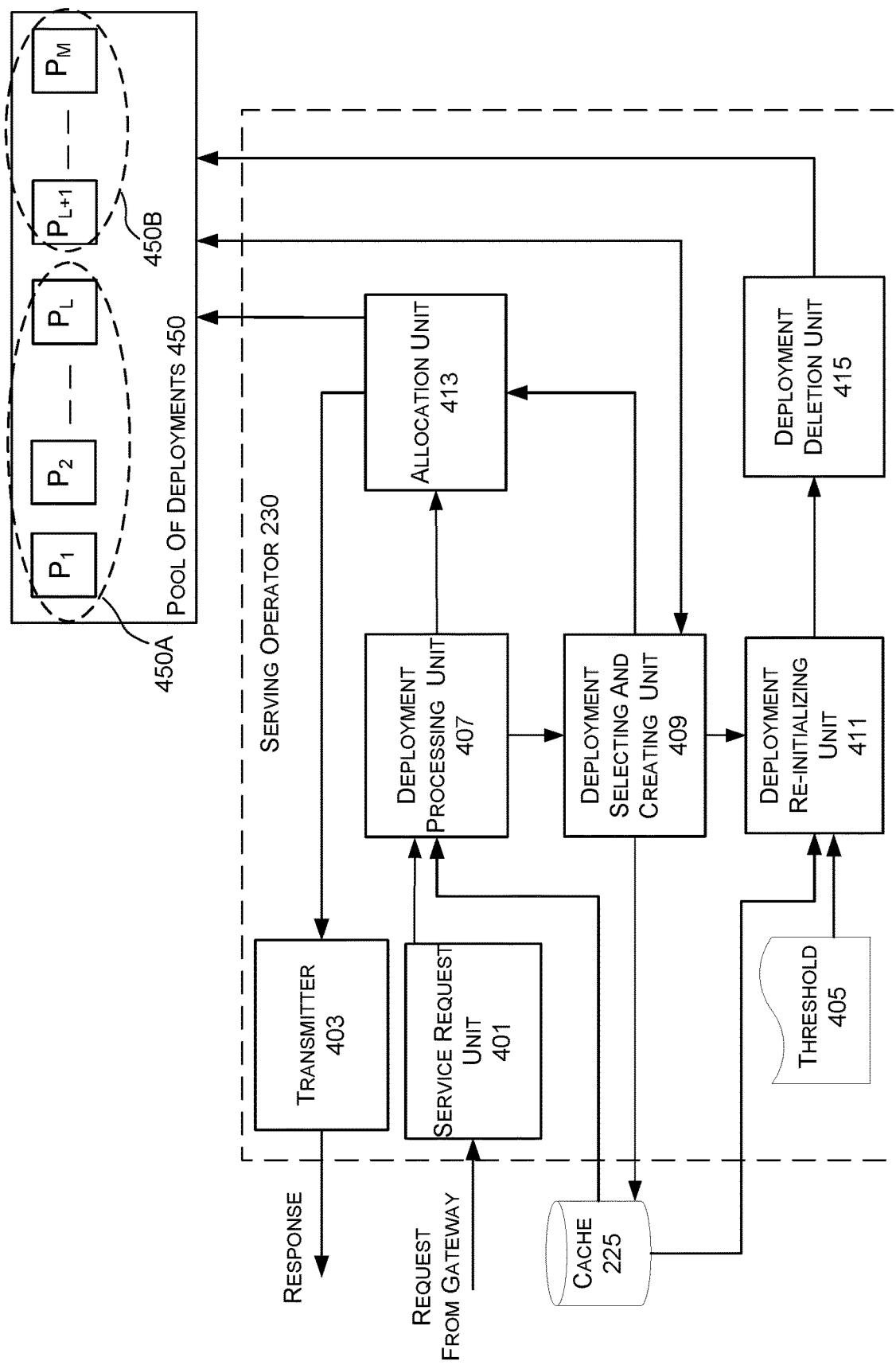
FIG. 4 depicts an exemplary serving operator included in the query serving system of FIG. 2 in accordance with various embodiments.

Turning now to FIG. 4, there is depicted an exemplary block diagram of a serving operator 230 included in the query serving system 200 (described herein with respect to FIG. 2) in accordance with various embodiments. The serving operator 230 includes a service request unit 401, a transmitter 403, a deployment processing unit 407, a deployment selecting and creating unit 409, a deployment re-initializing unit 411, an allocation unit 413, and a deployment deletion unit 415.

As shown in FIG. 4, the pool of deployments 450 includes a first pool of deployments 450A (referred to as a serving pool), and a second pool of deployments 450B (referred to as a free pool). The serving pool 450A includes deployments that are currently being used by the query serving system to serve user queries i.e., each deployment in the serving pool already has a model loaded in the corresponding serving container of the deployment, which is used to serve user queries.

In contrast, each deployment in the free pool 450B has a serving container and a model manager container already constructed. However, the serving container does not have a model that is currently loaded. In this manner, each deployment of the free pool can be used to load a model for a new skillbot request issued by a user. As will be described below, the query serving system is always guaranteed to have an available deployment in the free pool that can be used for a new skillbot. Moreover, it is appreciated that since the serving container and the model manager container are already constructed (prior to receiving any query) in each deployment of the free pool, a query serving time i.e., an amount of time required to serve the query, is reduced considerably as compared to the case of having to construct the serving container and the model manage container each time a request is received. For example, the query serving time is reduced from the order of tens of seconds (e.g. 80 to 90 seconds) to an order of a few seconds (e.g., 7 to 10 seconds).

The service request unit 401 is configured to receive and process a service request transmitted from the serving gateway of the query serving system. By one embodiment, the service request includes an identifier of a skillbot that is required to serve one or more user queries. The service request unit 401 may process the request e.g., extract the identifier of the skillbot from the request and forward the extracted identifier to the deployment processing unit 407. The deployment processing unit queries a cache 225 to determine whether the required skillbot is currently being served by any deployment included in the serving pool 450A. For instance, as stated previously, the cache 225 maintains a directory of deployments and and an identifier (ID) of a skillbot associated with each deployment. The deployment processing unit 407 utilizes the cache 225 to determine whether the required skillbot is currently being served by matching the identifier of the skillbot to an identifier included in the cache.

In the instance that the deployment processing unit 407 determines that the skillbot is currently served by a deployment i.e., one of the deployments in the serving pool, the deployment processing unit 407 triggers the allocation unit 413, which instructs the bot manager of the deployment to download any newer versions of the model (if available) from the object database. Further, the allocation unit 407 triggers the transmitter 403, which is configured to transmit a response to the serving gateway. The response can include information indicative of the deployment which serves the skillbot, so that the serving gateway can route the user's request to the deployment.

In case the deployment processing unit 407 determines that the skillbot is not currently being served by any deployment, the deployment processing unit 407 triggers the deployment selecting and creating unit 409. The deployment selecting and creating unit 409 selects a new deployment from the free pool of deployments 450B to serve the skillbot. The selection of the new deployment from the free pool of deployments 450B is performed in a random manner. Upon selecting the new deployment, the deployment selecting and creating unit 409 triggers the allocation unit 413, which instructs the bot manager of the newly selected deployment to load a model associated with the skillbot in the serving container of the new deployment.

The deployment selecting and creating unit 409 updates the cache 225 to reflect the addition of the newly selected deployment being associated with an identifier of the skillbot. The newly selected deployment is transferred from the free pool of deployments 450B to the serving pool of deployments 450A. According to some embodiments, upon transferring the newly selected deployment to the serving pool, the deployment selecting and creating unit 409 generates and transmits a request for creating a new deployment (to be added to the free pool) to the serving engine (i.e., serving engine 240 of FIG. 2). In this manner, for each deployment selected from the free pool of deployments to serve a skillbot, a new deployment is created and added to the free pool. As such, the query serving system ensures that the free pool 450B has a deployment ready to serve a newly requested skillbot.

According to certain embodiments, the serving operator 230 sets a limit on a maximum number of deployments that can exist in the serving pool 450A e.g., due to capacity constraints imposed on the query serving system. As such, whenever the deployment selecting and creating unit 409 selects a deployment from the free pool of deployments 450B to be included in the serving pool 450A, the deployment selecting and creating unit 409 triggers the deployment re-initializing unit 411, which ensures that there is sufficient capacity available in the serving pool 450A to accommodate the deployment selected from the free pool 450B.

The deployment re-initializing unit 411 queries the cache 225 to obtain a list of deployments (and identifiers of the associated skillbots) that are currently being utilized to serve user requests i.e., a list of deployments included in the serving pool 450A. The deployment re-initializing unit 411 compares a number of deployments included in the list to a threshold value of deployments 405 (e.g., the maximum number of deployments permitted in the serving pool 450A). If the number of deployments included in the obtained list is greater than the threshold value, the deployment re-initializing unit 411 activates the deployment deletion unit 415. Note that if the number of deployments in the obtained list is less than the threshold value, it implies that there is sufficient capacity in the serving pool, and thus a deletion of a deployment from the serving pool is not required. In this case, the serving operator proceeds to process the next request.

The deployment deletion unit 415 is configured to delete a deployment from the serving pool 450A based on one or more criteria, in order to make space (i.e., capacity) available for the deployment selected from the free pool 450B and that is to be transferred to the serving pool 450A. By one embodiment, the deployment deletion unit 415 utilizes a least recently used mechanism to identify a deployment of the serving pool 450A that is to be deleted. For instance, the deployment deletion unit 415 obtains metadata associated with each deployment of the serving pool 450A from the cache 225. The metadata includes timing information (e.g., a timestamp) that corresponds to a time instance as to when the deployment was used to address a prior query. The deployment deletion unit 415 identifies (and deletes) a deployment from the serving pool 450A having the lowest timestamp value i.e., the identified deployment is the deployment that was used least recently in time.

In this manner, the query serving system of FIG. 2 provides for a serving pool 450A having a maximum pool size (i.e., a maximum number of deployments permitted in the serving pool) and a free pool having a certain number of deployments that are always available to serve new requests for skillbots in a time-efficient manner. By one embodiment, the size of the free pool is set to be lower than the size of the serving pool e.g., the serving pool is set to have a maximum of ten deployments, whereas the free pool is set to have a limit of four deployments. It is appreciated that the serving pool 450A can be used to address queries from different users (i.e., tenants) in a concurrent manner. Further, the maximum size of the serving pool 450A as well as the size of the free pool 450B is configurable based on an amount of available capacity of a skillbot system.

Figure 5:
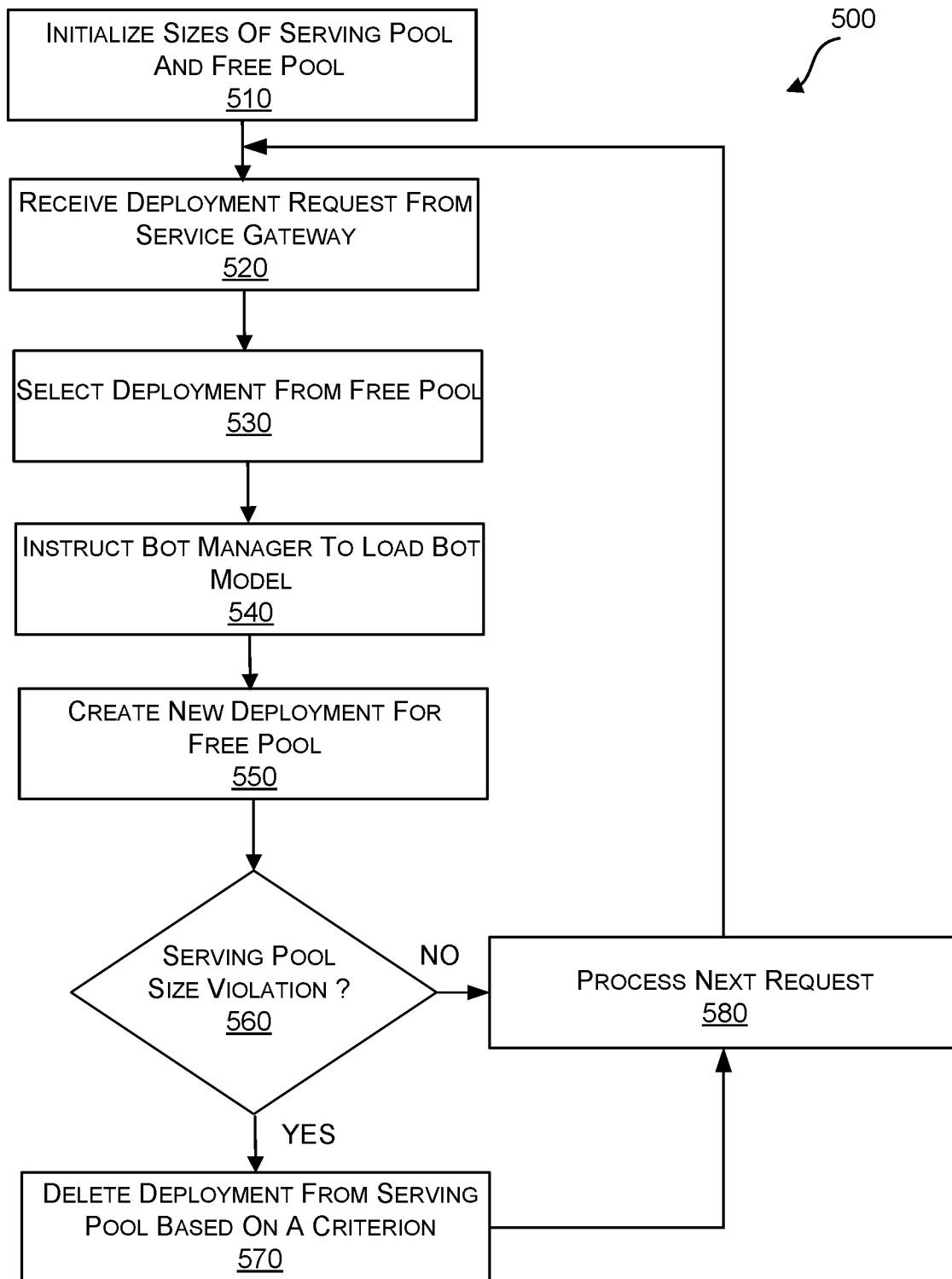
FIG. 5 depicts a flowchart illustrating a process performed by the serving operator of FIG. 4 in accordance with various embodiments.

FIG. 5 depicts a flowchart 500 depicting a process performed by the serving operator of FIG. 4 according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 5 may be performed by the serving operator 230 depicted in FIG. 4.

The process commences in step 510, wherein a size of the serving pool and a size of the free pool are initialized. The sizes of the serving pool and free pool are initialized based on an amount of available capacity of the query serving system. In step 520, the serving operator receives a request for a new deployment from the serving gateway.

The process in step 530 selects, in a random manner, a deployment from the free pool of deployments. Upon selecting the deployment from the free pool, the serving operator instructs a bot manager associated with the selected deployment to load a model associated with the skillbot in the serving container of the selected deployment in step 540. Upon the model being loaded in the serving container, the deployment is ready to be transferred from the free pool to the serving pool in order to use the deployment to serve user requests. Thereafter, in step 550, the serving operator transmits a request to the serving engine to create a new deployment that is to be added to the free pool. Specifically, each time a deployment is selected from the free pool and transferred to the serving pool, a new deployment is added to free pool. In this manner, the query serving system guarantees availability of a deployment in the free pool that can be used to serve a new skillbot. Moreover, it is appreciated that since the serving container and the model manager container are already constructed (prior to receiving any query) in each deployment of the free pool, a query serving time i.e., an amount of time required to serve the query, is reduced considerably as compared to the case of having to construct the serving container and the model manage container each time a request is received.

In step 560, the serving operator performs a query to determine a size of the serving pool i.e., a number of deployments included in the serving pool. The serving operator can determine a number of deployments in the serving pool by obtaining information related to the deployments that is stored in the cache. Each time a deployment is to be transferred from the free pool to the serving pool, the serving operator verifies whether there is sufficient capacity in the serving pool to accommodate the deployment that is to be transferred to the serving pool. As stated previously, the serving pool is set to have a maximum number of deployments that can be included in the serving pool. As such, in step 560, the serving operator determines whether a number of deployments included in the serving pool are greater than the maximum number of deployments.

If the response to the query of step 560 is negative i.e., the serving pool does not violate the requirement of having at most the maximum number of deployments, then the selected deployment from the free pool is transferred to the serving pool and the process moves to step 580, wherein the serving operator proceeds to process the next request. However, if the response to the query of step 560 is affirmative i.e., the serving pool violates the maximum number of permitted deployments, then the process moves to step 570.

In step 570, the serving pool identifies a deployment (from the existing deployments in the serving pool) that is to be deleted in order to make capacity available to accommodate the deployment that is to be transferred from the free pool. As stated previously, the serving operator may identify the deployment to be deleted from the serving pool based on one or more criterion. For instance, the serving operator may identify the deployment that is to be deleted to correspond to the deployment that is used least recently. Upon identifying the deployment to be deleted, the serving operator proceeds to delete the deployment and thereafter moves the deployment selected from the free pool to the serving pool. The process then moves to step 580, wherein the serving operator proceeds to process the next request.

Figure 6:
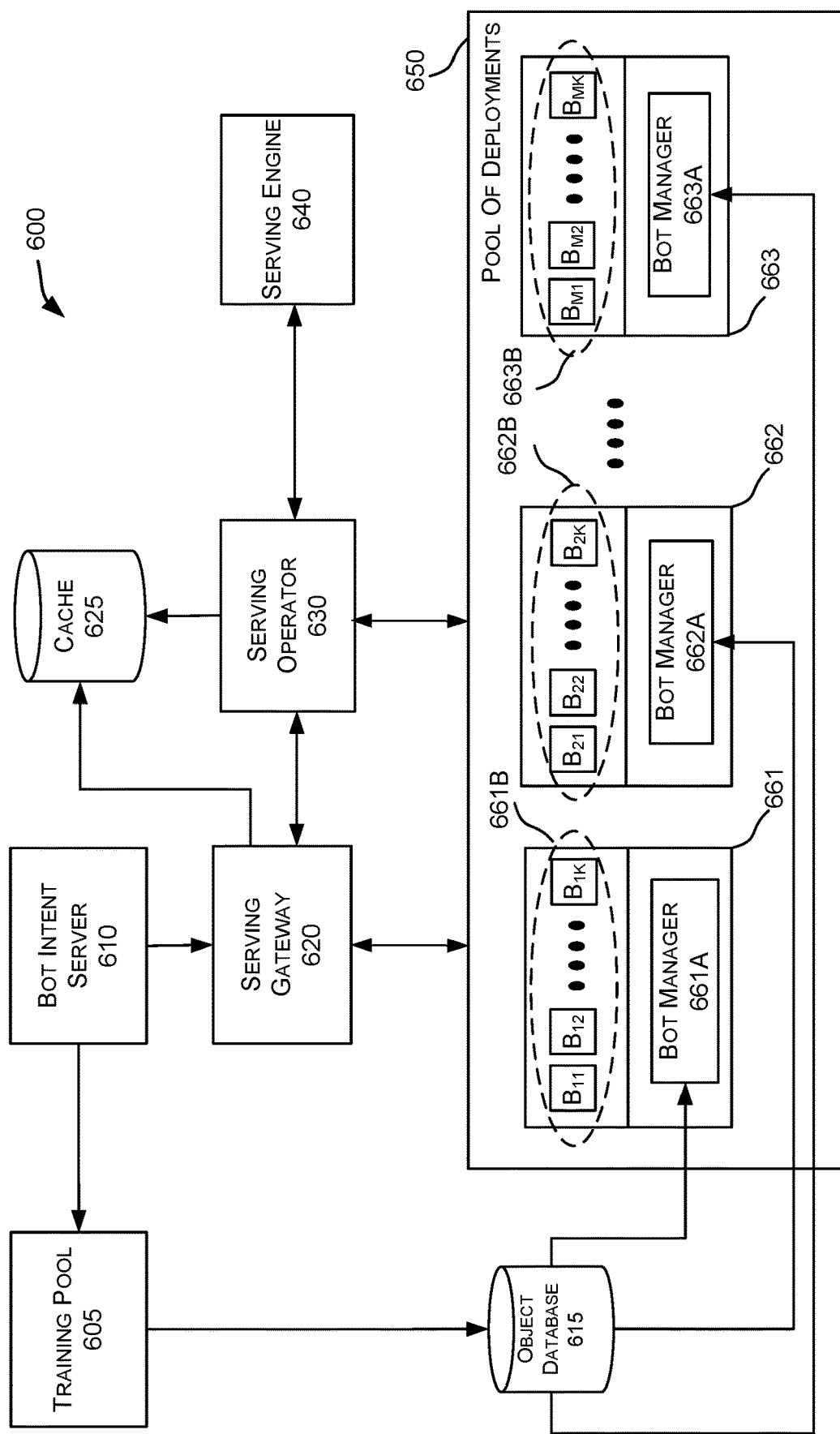
FIG. 6 depicts another exemplary query serving system in accordance with various embodiments.

FIG. 6 depicts another exemplary query serving system in accordance with various embodiments. As shown in FIG. 6, the query serving system 600 includes a training pool 605, a bot intent server 610, an object database 615, a serving gateway 620, a cache 625, a serving operator 630, a serving engine 640, and a pool of pods (i.e., a pool of deployments) 650. The pool of deployments 650 includes a plurality of deployments 661, 662, and 663, respectively.

Each deployment of the pool of deployments 650 includes a serving container and a model manager container. The serving container of each deployment e.g., deployment 661, includes a plurality of sub-containers 661B. Each sub-container is configured to host a machine learning model (i.e., a model) associated with a skillbot/chatbot. The model manager container hosts a bot manager (i.e., a model manager) 661A that controls the plurality of sub-containers 661B. Specifically, for each sub-container, the model manager 661A downloads a model associated with a skillbot (e.g., skillbot 116-1 of FIG. 1) from the object database 615, as well as checks and downloads newer versions of the model whenever they are available so that the model may be used to serve a query (issued by a user) targeted to the skillbot. In this manner, the query serving system of FIG. 6 may utilize the models loaded in the sub-containers of each deployment of the pool of deployments to address queries from different users i.e., the query serving system of FIG. 6 is a multi-tenant query serving system.

When new skillsbots are created, the query serving system 600 trains models associated with each skillbot and maintains a list of models in the training pool 605. Upon completion of training of a model, the trained model is stored in the object database 615. At runtime, the bot intent server 610 receives a request to serve a query associated with a skillbot. The bot intent server 610, forwards the query to the serving gateway 620. The serving gateway 620 queries the cache 625 to determine, whether a model associated with a skillbot has already been deployed in one of the sub-containers of a deployment of the pool of deployments 650. For instance, the cache 625 maintains a directory of deployments, wherein each deployment is associated with a list of skillbot identifiers corresponding to the skillbots that are currently being served via the sub-containers of the deployment. The serving gateway 620 utilizes the cache 625 to determine whether a particular skillbot (e.g., the skillbot to be utilized for processing the query) is being served by one of the sub-containers of a deployment. If the skillbot to be used to process the query is being served by a deployment, the serving gateway 620 forwards the query to the respective deployment, so that the model (loaded in the sub-container of the deployment) associated with the skillbot can be used to address the query. Thereafter, the serving gateway 620 receives a response associated with the query and returns the response to the intent server 610, to be eventually forwarded to the user.

However, if the serving gateway 620 determines that the particular skillbot is currently not served by any deployment in the pool of deployments 250, the serving gateway 220 transmits a service request to the serving operator 630. In turn, the serving operator 630 generates and transmits a request to the serving engine 240 to create a new deployment to be added to the pool of deployments so that a model associated with the skillbot can be loaded in a sub-container of the deployment. According to some embodiments, the query serving serving system sets a limit on a maximum number of deployments that can be included in the pool of deployments 650 e.g. due to capacity constraints. As such, the serving operator 630 transmits a request for the creation of a new deployment to be added to the pool of deployments 650, until the maximum number of deployments have been added to the pool of deployments 650. Once the maximum number of deployments have been instantiated in the pool of deployments, the serving operator ceases to transmit requests to the serving engine for the creation of new deployments. As will be described later, once the pool of deployments 650 includes the maximum number of deployments, the serving operator utilizes different mechanism to accommodate the request for the new skillbot.

According to some embodiments, the serving engine 640 is configured to create a deployment for the skillbot. Upon creation of the deployment, the service engine 640 transmits an acknowledgement to the serving operator 630. The serving operator 630 instructs the bot manager of the newly instantiated deployment to download a model (from the object database 615) associated with the skillbot into a sub-container of the deployment so that the model can be utilized for serving input queries. Upon the skillbot being instantiated within the deployment, the serving operator 630 informs the serving gateway 620 of the availability of the newly instantiated skillbot, where after the serving gateway 620 forwards the query to the newly instantiated skillbot for further processing. Additionally, the serving operator 630 updates the cache 625 to reflect the instantiation of the new skillbot within the pool of deployments 650, so that future queries (targeted to the skillbot) can be directly handled by the serving gateway 620. Details regarding the operation of the serving operator 630 and the management of the pool of deployments 650 are described later with reference to FIG. 8.

Figure 7:
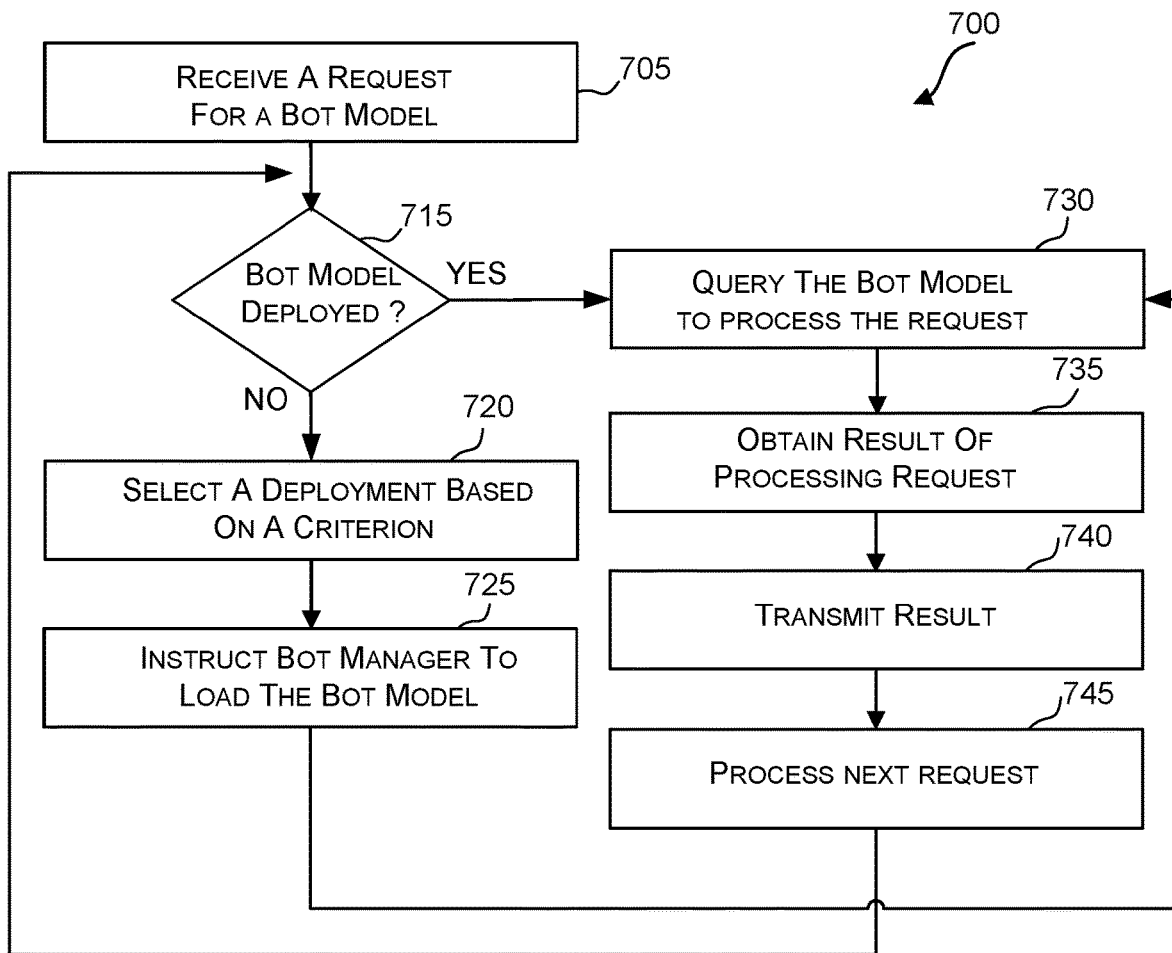
FIG. 7 depicts a flowchart illustrating a process performed by the query serving system of FIG. 6 in accordance with various embodiments.

FIG. 7 depicts a flowchart illustrating a process performed by the query serving system of FIG. 6 in accordance with various embodiments. The processing depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 7 and described below is intended to be illustrative and non-limiting. Although FIG. 7 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 7 may be performed by the query serving system 600 depicted in FIG. 6.

The process commences in step 705, wherein the query serving system receives a request for a bot model i.e., the intent server of the query serving system 600 receives a request to serve a query with regard to a skillbot. In some embodiments, the received request is forwarded to a serving gateway of the query serving system.

The process commences in step 705, wherein the query serving system receives a request for a bot model i.e., the intent server of the query serving system 600 receives a request to serve a query with regard to a skillbot. In some embodiments, the received request is forwarded to a serving gateway of the query serving system. In step 715, the serving gateway performs a query to determine whether the skillbot is already deployed in a sub-container of one of the deployments of the pool of deployments. For instance, the serving gateway references a directory of deployments (stored in a cache) to verify whether an identifier of the skillbot is associated with a deployment i.e., the skillbot is served by a sub-container of the deployment. If the response to the query is affirmative, the process moves to step 730. However, if the response to the query is negative, the process moves to step 720.

In step 720 (i.e., when the skillbot is not being served by any sub-container of any deployment of the pool of deployments), the query serving system selects a deployment from the pool of deployments to serve the model associated with the skillbot based on one or more criterion. According to an embodiment, a maximum number of deployments that can be included in the pool of deployments is fixed and determined (prior to serving any query) based on an amount of available capacity that can be allocated to the query serving system. In one instance, when the required skillbot is not being served by any sub-container of any deployment, the query serving system executes a query to determine whether there exists a deployment that is currently not serving any skillbots. If the response to the query is affirmative, then the query serving system selects the deployment (i.e., the deployment not serving any skillbots) to correspond to the deployment that will host a model associated with the required skillbot in one of the sub-containers of the deployment. However, if the response to the query is negative i.e., each deployment in the pool of deployments is serving at least one skillbot, then the query serving system utilizes one or more criteria as described below to select a deployment to host the required skillbot.

According to some embodiments, when the pool of deployments includes the maximum number of deployments, the query serving system utilizes one of a plurality of selection schemes to select a deployment to host the required skillbot. Note that each deployment of the pool of deployments includes a plurality of sub-containers. A sub-container is considered to be an active sub-container, if the sub-container hosts a model associated with some skillbot, whereas if the sub-container is empty i.e., does not host any model, then the sub-container is considered to be a vacant sub-container. In selecting a deployment to host a model associated with the required skillbot, the schemes may correspond to: (a) selecting a deployment that has at least one vacant sub-container in a random manner (b) selecting a deployment that has at least one vacant sub-container using a round-robin approach or (c) selecting the last used deployment (assuming that the last used deployment has at least one vacant sub-container) etc.

According to one embodiment, the selection scheme corresponds to selecting a deployment having a lowest number of active sub-containers i.e., the deployment serving the lowest number of skillbots. It is appreciated that in selecting the deployment with the lowest number of active sub-containers, it is verified that the sub-container has at least one vacant sub-container.

According to one embodiment, the selection scheme corresponds to selecting the deployment from the pool of deployments utilizing a metric based approach. For instance, the query serving system monitors usage activity for each deployment in the pool of deployments. Usage activity may correspond to determining how many sub-containers in a particular deployment are being utilized in a certain time-period or determining a frequency of usage of each sub-container, etc. In other words, the query serving system tracks the usage activity of each deployment of the pool of deployments to determine a load of the deployment i.e., a number of requests directed to a deployment in a certain time-period. In one instance, the query serving system selects the deployment having the lightest load. In this manner, the query serving system distributes the traffic requests from users across the different deployments. It is appreciated that in the above described scenarios of selecting a deployment to host the required skillbot, the query serving system upon selecting a particular deployment, utilizes any one of the available (i.e., vacant) sub-containers of the deployment to host the model associated with the required skillbot.

Upon selecting the deployment to host the model associated with the skillbot in step 720, the process moves to step 725, wherein the serving operator of the query serving system instructs the bot manager (associated with the selected deployment) to load the model associated with the skillbot in a vacant sub-container of the deployment. Thereafter the process moves to step 730.

In step 730, the query serving system utilizes the model loaded in the sub-container to process the request i.e., the sub-container of the deployment serves the request by utilizing the model associated with the skillbot. In step 735, the serving gateway of the query serving system obtains results related to the processing of the request from the skillbot. In step 740, the serving gateway transmits the obtained results to the intent server. Upon completion of processing the request, the process moves to step 745, wherein the query serving system proceeds to process the next request i.e., the process loops back to step 705.

Figure 8:
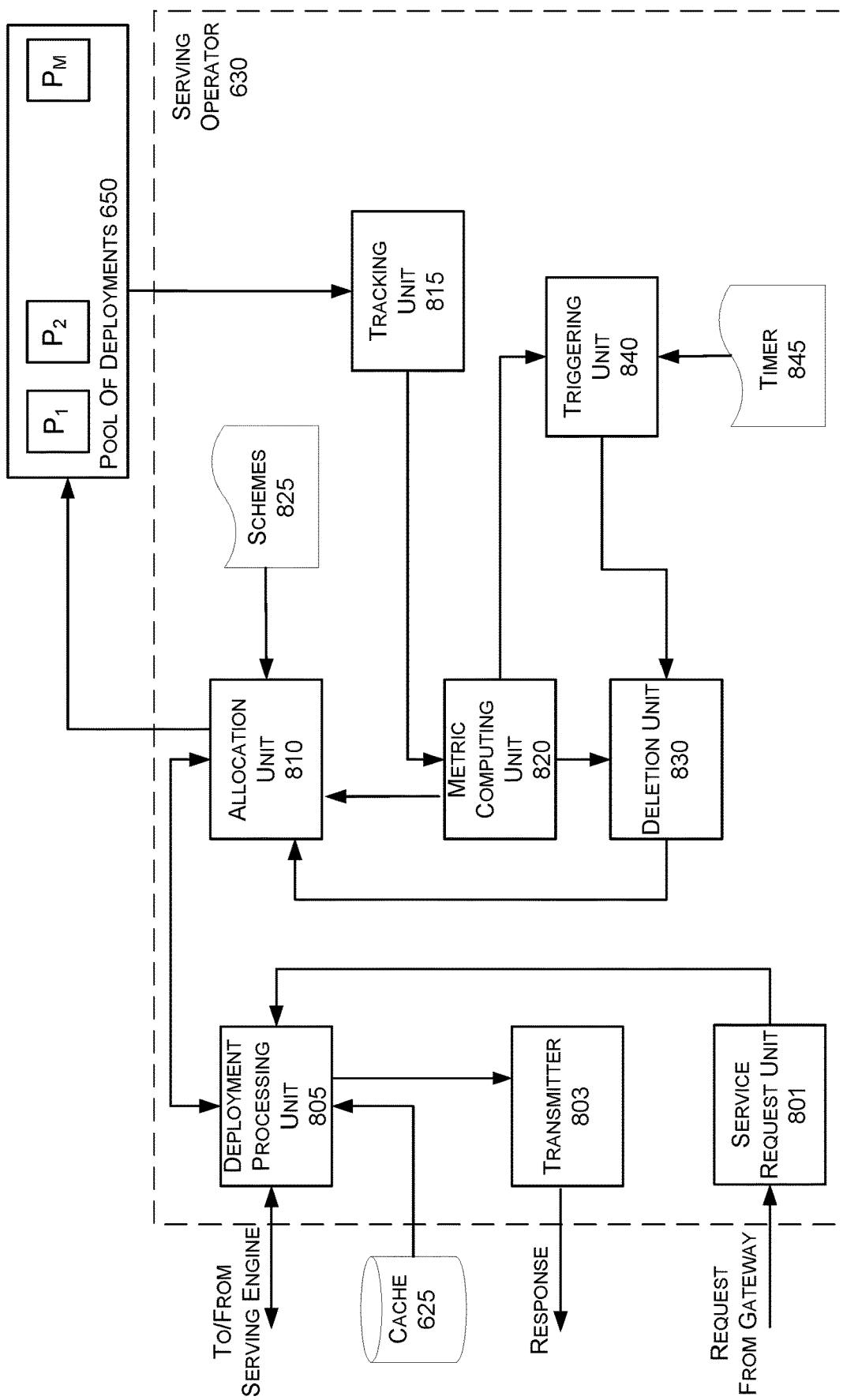
FIG. 8 depicts an exemplary serving operator included in the query serving system of FIG. 6 in accordance with various embodiments.

Turning now to FIG. 8, there is depicted an exemplary block diagram of a serving operator 630 included in the query serving system 600 of FIG. 6 in accordance with various embodiments. The serving operator 630 includes a service request unit 801, a transmitter 803, a deployment processing unit 805, an allocation unit 810, a tracking unit 815, a metric computing unit 820, a deletion unit 830, and a triggering unit 840.

The pool of deployments 650 includes a fixed number of deployments that is determined based on an amount of available capacity allocated to the query serving system. Each deployment of the pool of deployments 650 incudes a plurality of sub-containers, each of which is configured to host a model associated with a skillbot. Each deployment includes a model manager that controls the plurality of sub-containers of the deployment i.e., the model manager retrieves a model from an object database and loads the model in one of the sub-containers of the deployment.

The service request unit 801 is configured to receive and process a service request transmitted from the serving gateway of the query serving system. By one embodiment, the service request includes an identifier of a skillbot that is required to serve one or more user queries. The service request unit 801 processes the request e.g., extracts an identifier of the skillbot from the request and forwards the extracted identifier to the deployment processing unit 805. The deployment processing unit 805 queries a cache 625 to determine whether the required skillbot is currently being served by any sub-container of a deployment included in the pool of deployments 650. For instance, as stated previously, the cache 615 maintains a directory of deployments, wherein each deployment is associated with a list of skillbot identifiers corresponding to the skillbots that are currently being served via the sub-containers of the deployment. The deployment processing unit 805 utilizes the cache 615 to determine whether the required skillbot is currently being served by any sub-container by matching the identifier of the skillbot to an identifier included in the cache.

In the instance that the deployment processing unit 805 determines that the skillbot is currently served by a sub-container of a deployment, the deployment processing unit 805 triggers the allocation unit 810, which instructs the bot manager of the deployment to download any newer versions of the model (if available) from the object database. Further, the deployment processing unit 805 triggers the transmitter 803 to transmit a response to the serving gateway. The response can include information indicative of the deployment (and the sub-container within the deployment) which serves the skillbot, so that the serving gateway can route the user's request to the deployment. In case the deployment processing unit 805 determines that the skillbot is not currently being served by any sub-container of the pool of deployments, the deployment processing unit 805 utilizes one of the following described mechanisms to accommodate the request received from the serving gateway.

According to one aspect, the deployment processing unit 805 determines whether the maximum number of permitted deployments exists (i.e., the fixed number of deployments) in the pool of deployments 650. If the pool of deployments 650 does not include the maximum number of deployments, then the deployment processing unit 805 transmits a request to the serving engine of the query serving system to create a new deployment to be included in the pool of deployments. Thereafter, the deployment processing unit 805 triggers the allocation unit 810, which instructs the bot manager of the newly created deployment to load a model associated with the skillbot in one of the sub-containers of the newly created deployment, and further triggers the transmitter 803 to transmit the response to the serving gateway. Moreover, the deployment processing unit 805 updates the cache 625 to reflect the addition of the newly created deployment and the sub-container of the deployment which serves the skillbot.

According to one aspect, if the pool of deployments 650 includes the maximum number of deployments, then the deployment processing unit 805 triggers the allocation unit 825 to utilize one of a plurality of selection schemes 825 to select a deployment to host the required skillbot. As stated previously, in selecting a deployment to host a model associated with the required skillbot, the schemes may correspond to: (a) selecting a deployment that has at least one vacant sub-container in a random manner (b) selecting a deployment that has at least one vacant sub-container using a round-robin approach or (c) selecting the last used deployment (assuming that the last used deployment has at least one vacant sub-container) etc. By one embodiment, the selection scheme corresponds to selecting a deployment having a lowest number of active sub-containers i.e., the deployment serving the lowest number of skillbots. It is appreciated that in selecting the deployment with the lowest number of active sub-containers, the allocation unit 810 verifies that the sub-container has at least one vacant sub-container.

According to another aspect, the selection of one of the deployments from the pool of deployments 650 may be performed based on a metric driven approach. For instance, the tracking unit 815 monitors usage activity of each deployment in the pool of deployments 650. Usage activity may correspond to determining how many sub-containers in a particular deployment are being utilized in a certain time-period to address user queries or determining a frequency of usage of each sub-container, etc. In other words, the tracking unit 815 tracks the usage activity of each deployment of the pool of deployments, wherein the usage activity is utilized by the metric computing unit 820 to compute a metric e.g., a traffic load of each deployment (i.e., a number of requests directed to a deployment in a certain time-period). Based on the computed metrics of the deployments, the allocation unit 810 selects the deployment having a lightest load. In this manner, the query serving system distributes the traffic requests from users across the different deployments. It is appreciated that in the above described scenarios of selecting a deployment to host the required skillbot, the allocation unit 810 utilizes any one of the available (i.e., vacant) sub-containers of the selected deployment to host the model associated with the required skillbot.

By some embodiments, in order to ensure that the pool of deployments 650 has sufficient capacity (i.e., vacant sub-containers in the deployments) to accommodate new requests, the serving operator includes the triggering unit 840 which is triggered by a timer 845 e.g. on a periodic basis to perform a clean-up process of the pool of deployments. Specifically, the triggering unit upon being activated for example, upon the expiration of a periodic timer, activates the deletion unit 830 of the serving operator 630. The deletion unit 830 utilizes a least recently used mechanism to identify at least one sub-container within each deployment of the pool of deployments 650 that is to be cleaned e.g., a model loaded in the sub-container is to be deleted. By one embodiment, the deletion unit 830 obtains metadata associated with each active sub-container of each deployment. The metadata includes timing information (e.g., a timestamp) that corresponds to a time instance as to when the sub-container was used to address a prior query. The deletion unit 830 identifies, for each deployment, the sub-container having the lowest timestamp value i.e., the identified sub-container of a deployment that was used least recently in time. Thereafter, the deletion unit 830 instructs the allocation unit to delete the model that was previously loaded in the identified sub-container.

According to some embodiments, the deletion unit may identify one or more deployments from the pool of deployments that are to be cleaned (i.e., re-initialized) based on a number of active sub-containers within the deployment. For example, for each deployment, the deletion unit 830 obtains a list of sub-containers that are currently being utilized to serve user requests. The deletion unit 830 compares the number of active sub-containers with each deployment to a threshold value of sub-containers. If the number of active sub-containers is greater than the threshold value, then the deletion unit performs the cleanup process on the deployment by identifying (and deleting) the least recently used sub-container of the deployment. In this manner, the serving operator 630 ensures that each deployment in the pool of deployments has available capacity to accommodate future skillbot requests.

Figure 9:
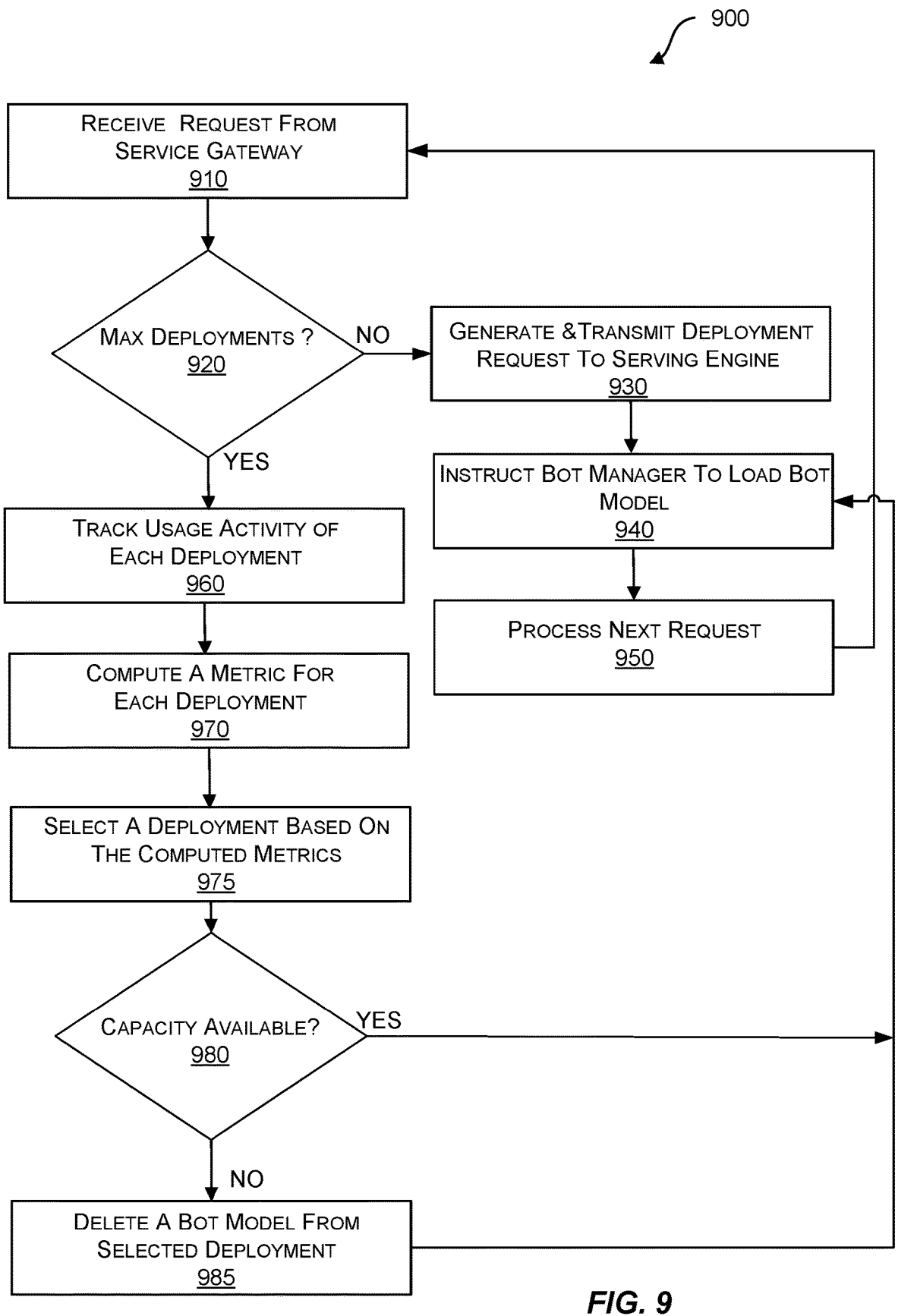
FIG. 9 depicts a flowchart illustrating a process performed by the serving operator of FIG. 8 in accordance with various embodiments.

FIG. 9 depicts a flowchart illustrating a process performed by the serving operator of FIG. 8 in accordance with various embodiments. Specifically, FIG. 9 illustrates the steps performed by the serving operator in accommodating a skillbot that is currently not deployed in any sub-container of the deployments included in the pool of deployments. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 9 may be performed by the serving operator 630 depicted in FIG. 8.

The process commences in step 910, wherein the serving operator receives a request (from the serving gateway) to serve a query for a new skillbot. In step 920, the serving operator executes a query to determine whether a maximum number of deployments have been created in the pool of deployments. If the response to the query of step 920 is negative, the process moves to step 930, else the process moves to step 960.

If the pool of deployments does not include the maximum number of deployments permitted, then the serving operator in step 930 generates and transmits a request to the serving engine of the query serving system to create a new deployment to be added to the pool of deployments. The serving operator uses the new deployment to serve the new skillbot. In step 940, the serving operator instructs a bot manager associated with the newly created deployment to load a model associated with the new skillbot in one of the sub-containers included in the new deployment. The serving operator utilizes the sub-container having the model associated with the new skillbot to process the request from the user. Thereafter, the process moves to step 950 to process the next request.

If the response to the query of step 920 is affirmative i.e., the pool of deployments includes the maximum number of deployments, the process in step 960 tracks usage activity of each deployment of the pool of deployments. The usage activity corresponds to determining how many sub-containers in a particular deployment are being utilized in a certain time-period or determining a frequency of usage of each sub-container, etc. The process in step 970 computes a metric for each deployment based on the tracked usage activity of step 960. The metric corresponds to a traffic load handled by each deployment of the pool of deployments.

The process then moves to step 975, wherein the serving operator selects a particular deployment from the pool of deployments to host the new skillbot. For example, the serving operator may utilize any one of the previously described selection schemes to select a deployment to host the new skillbot. The process then proceeds to step 980, wherein a query is performed to determine whether the selected deployment has sufficient capacity e.g., one or more vacant sub-containers to host a model associated with the new skillbot. If the response to the query of step 980 is affirmative, the process loops back to step 940, else the process moves to step 985.

In step 985 i.e., when the selected deployment does not have sufficient capacity, the serving operator identifies a sub-container in the selected deployment, wherein the model previously loaded in the identified sub-container is to be deleted. As stated previously, the model corresponding to a least recently used sub-container from the selected deployment may be identified to be deflected. Thereafter, the process loops back to step 940, wherein the bot manager associated with the selected deployment is instructed to load a model corresponding to the new skillbot in one of the available sub-containers of the deployment. Further, the process moves to step 950 to process the next request.

Illustrative Systems

Figure 10:
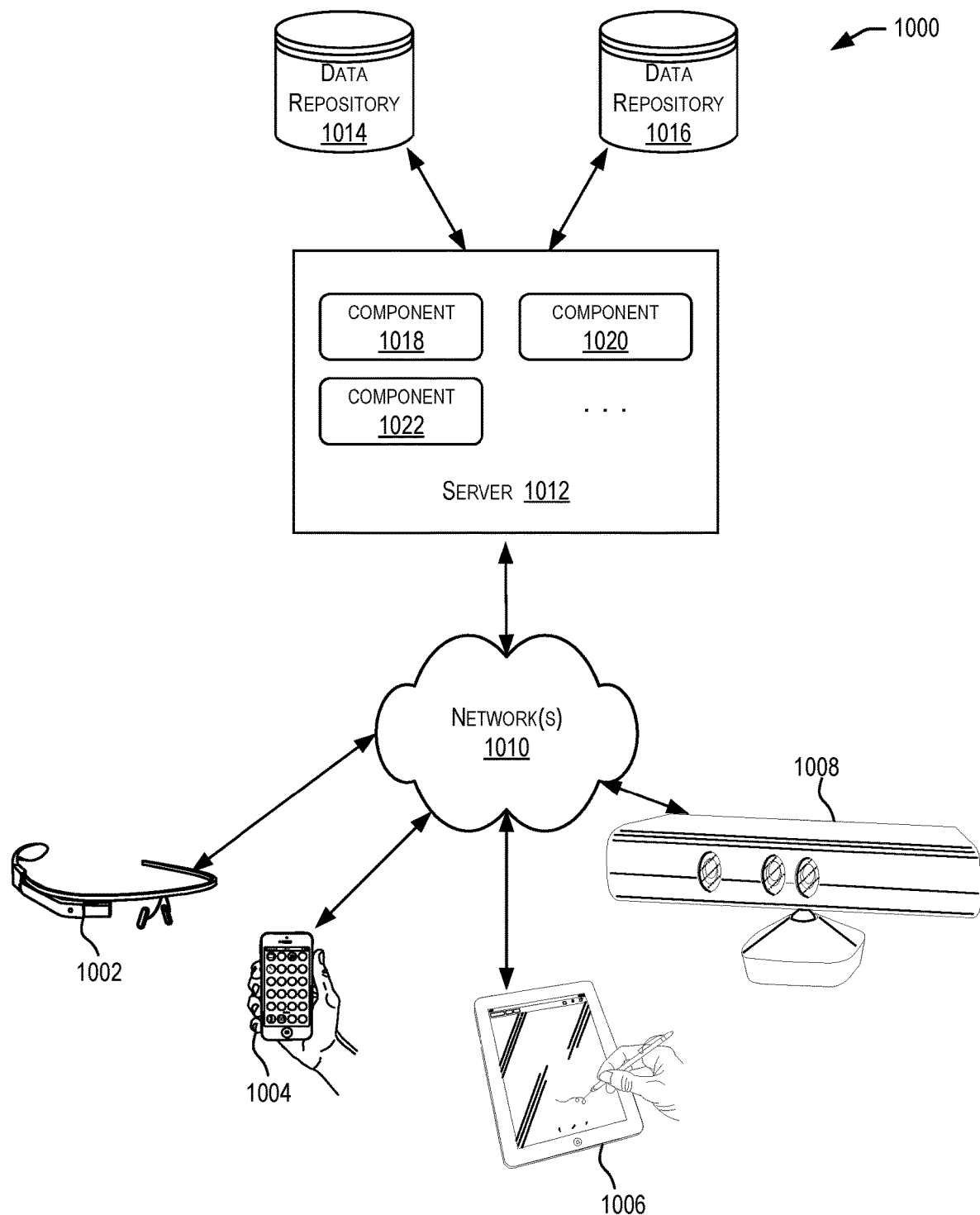
FIG. 10 depicts a simplified diagram of a distributed system for implementing various embodiments.

FIG. 10 depicts a simplified diagram of a distributed system 1000. In the illustrated example, distributed system 1000 includes one or more client computing devices 1002, 1004, 1006, and 1008, coupled to a server 1012 via one or more communication networks 1010. Clients computing devices 1002, 1004, 1006, and 1008 may be configured to execute one or more applications.

In various examples, server 1012 may be adapted to run one or more services or software applications that enable one or more embodiments described in this disclosure. In certain examples, server 1012 may also provide other services or software applications that may include non-virtual and virtual environments. In some examples, these services may be offered as web-based or cloud services, such as under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, server 1012 may include one or more components 1018, 1020 and 1022 that implement the functions performed by server 1012. These components may include software components that may be executed by one or more processors, hardware components, or combinations thereof. It should be appreciated that various different system configurations are possible, which may be different from distributed system 1000. The example shown in FIG. 10 is thus one example of a distributed system for implementing an example system and is not intended to be limiting.

Users may use client computing devices 1002, 1004, 1006, and/or 1008 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 10 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1010 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 may include one or more virtual machines running virtual operating systems, or other computing architectures involving virtualization such as one or more flexible pools of logical storage devices that may be virtualized to maintain virtual storage devices for the server. In various examples, server 1012 may be adapted to run one or more services or software applications that provide the functionality described in the foregoing disclosure.

The computing systems in server 1012 may run one or more operating systems including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more data repositories 1014, 1016. These data repositories may be used to store data and other information in certain examples. For example, one or more of the data repositories 1014, 1016 may be used to store information such as information related to chatbot performance or generated models for use by chatbots used by server 1012 when performing various functions in accordance with various embodiments. Data repositories 1014, 1016 may reside in a variety of locations. For example, a data repository used by server 1012 may be local to server 1012 or may be remote from server 1012 and in communication with server 1012 via a network-based or dedicated connection. Data repositories 1014, 1016 may be of different types. In certain examples, a data repository used by server 1012 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1014, 1016 may also be used by applications to store application data. The data repositories used by applications may be of different types such as, for example, a key-value store repository, an object store repository, or a general storage repository supported by a file system.

Figure 11:
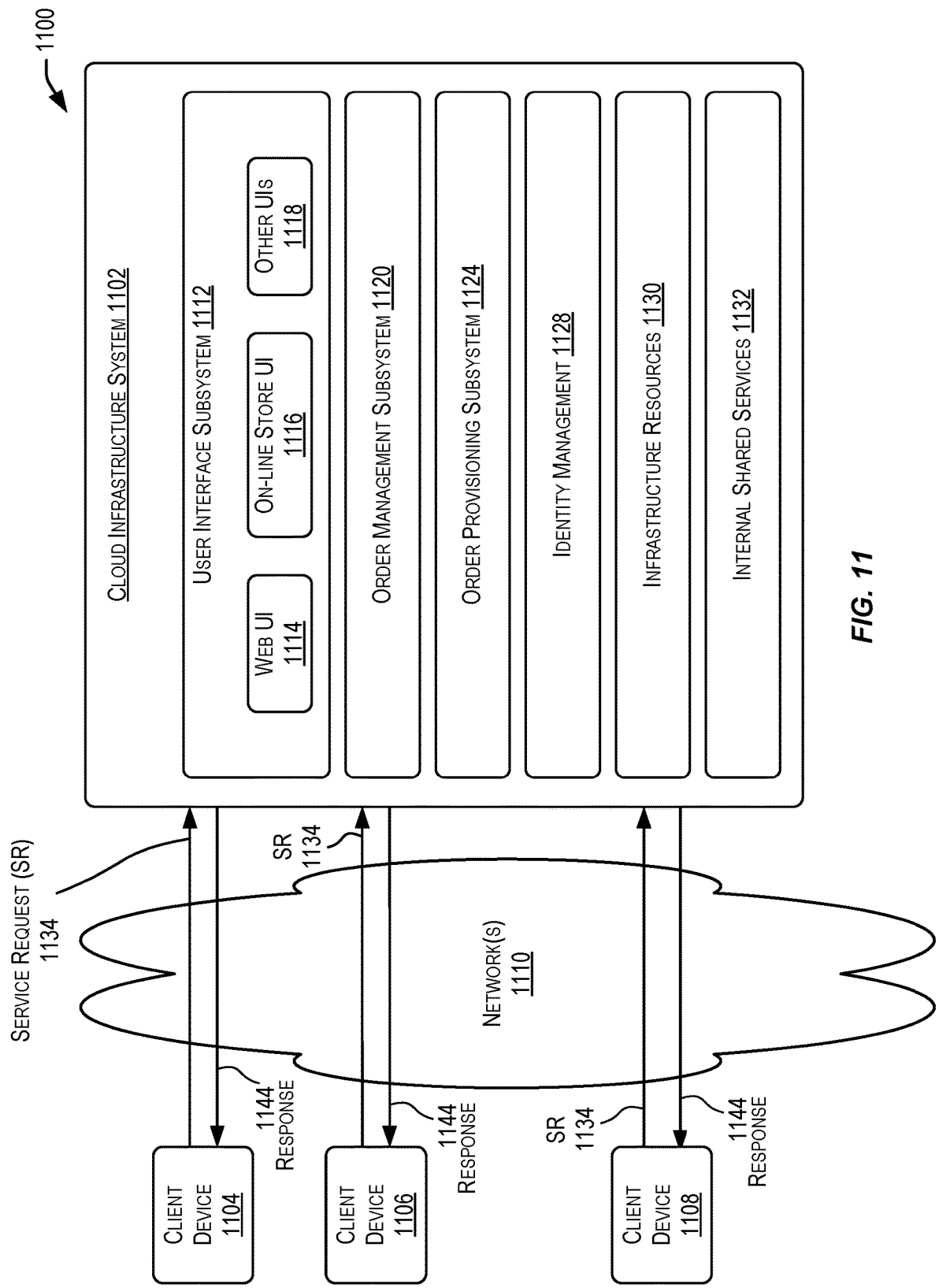
FIG. 11 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 11 is a simplified block diagram of a cloud-based system environment in which various services may be offered as cloud services in accordance with certain examples. In the example depicted in FIG. 11, cloud infrastructure system 1102 may provide one or more cloud services that may be requested by users using one or more client computing devices 1104, 1106, and 1108. Cloud infrastructure system 1102 may comprise one or more computers and/or servers that may include those described above for server 1012. The computers in cloud infrastructure system 1102 may be organized as general purpose computers, specialized server computers, server farms, server clusters, or any other appropriate arrangement and/or combination.

Network(s) 1110 may facilitate communication and exchange of data between clients 1104, 1106, and 1108 and cloud infrastructure system 1102. Network(s) 1110 may include one or more networks. The networks may be of the same or different types. Network(s) 1110 may support one or more communication protocols, including wired and/or wireless protocols, for facilitating the communications.

The example depicted in FIG. 11 is only one example of a cloud infrastructure system and is not intended to be limiting. It should be appreciated that, in some other examples, cloud infrastructure system 1102 may have more or fewer components than those depicted in FIG. 11, may combine two or more components, or may have a different configuration or arrangement of components. For example, although FIG. 11 depicts three client computing devices, any number of client computing devices may be supported in alternative examples.

The term cloud service is generally used to refer to a service that is made available to users on demand and via a communication network such as the Internet by systems (e.g., cloud infrastructure system 1102) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 1102 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1102 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1102. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1102. Cloud infrastructure system 1102 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 1102 may be configured to provide one or even multiple cloud services.

Cloud infrastructure system 1102 may provide the cloud services via different deployment models. In a public cloud model, cloud infrastructure system 1102 may be owned by a third party cloud services provider and the cloud services are offered to any general public customer, where the customer may be an individual or an enterprise. In certain other examples, under a private cloud model, cloud infrastructure system 1102 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1102 and the services provided may be shared by several organizations in a related community. Various other models such as hybrids of the above mentioned models may also be used.

Client computing devices 1104, 1106, and 1108 may be of different types (such as client computing devices 1002, 1004, 1006, and 1008 depicted in FIG. 10) and may be capable of operating one or more client applications. A user may use a client device to interact with cloud infrastructure system 1102, such as to request a service provided by cloud infrastructure system 1102. For example, a user may use a client device to request information or action from a chatbot as described in this disclosure.

In some examples, the processing performed by cloud infrastructure system 1102 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 1102 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 11, cloud infrastructure system 1102 may include infrastructure resources 1130 that are utilized for facilitating the provision of various cloud services offered by cloud infrastructure system 1102. Infrastructure resources 1130 may include, for example, processing resources, storage or memory resources, networking resources, and the like. In certain examples, the storage virtual machines that are available for servicing storage requested from applications may be part of cloud infrastructure system 1102. In other examples, the storage virtual machines may be part of different systems.

In certain examples, to facilitate efficient provisioning of these resources for supporting the various cloud services provided by cloud infrastructure system 1102 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1102 may itself internally use services 1132 that are shared by different components of cloud infrastructure system 1102 and which facilitate the provisioning of services by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1102 may comprise multiple subsystems. These subsystems may be implemented in software, or hardware, or combinations thereof. As depicted in FIG. 11, the subsystems may include a user interface subsystem 1112 that enables users or customers of cloud infrastructure system 1102 to interact with cloud infrastructure system 1102. User interface subsystem 1112 may include various different interfaces such as a web interface 1114, an online store interface 1116 where cloud services provided by cloud infrastructure system 1102 are advertised and are purchasable by a consumer, and other interfaces 1118. For example, a customer may, using a client device, request (service request 1134) one or more services provided by cloud infrastructure system 1102 using one or more of interfaces 1114, 1116, and 1118. For example, a customer may access the online store, browse cloud services offered by cloud infrastructure system 1102, and place a subscription order for one or more services offered by cloud infrastructure system 1102 that the customer wishes to subscribe to. The service request may include information identifying the customer and one or more services that the customer desires to subscribe to. For example, a customer may place a subscription order for a service offered by cloud infrastructure system 1102. As part of the order, the customer may provide information identifying a chatbot system for which the service is to be provided and optionally one or more credentials for the chatbot system.

In certain examples, such as the example depicted in FIG. 11, cloud infrastructure system 1102 may comprise an order management subsystem (OMS) 1120 that is configured to process the new order. As part of this processing, OMS 1120 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1120 may then invoke the order provisioning subsystem (OPS) 1124 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1124 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1102 as part of the provisioning process. Cloud infrastructure system 1102 may generate an application ID and select a storage virtual machine for an application from among storage virtual machines provided by cloud infrastructure system 1102 itself or from storage virtual machines provided by other systems other than cloud infrastructure system 1102.

Cloud infrastructure system 1102 may send a response or notification 1144 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 1102 and information identifying a chatbot system selected by cloud infrastructure system 1102 for the chatbot system corresponding to the chatbot system ID.

Cloud infrastructure system 1102 may provide services to multiple customers. For each customer, cloud infrastructure system 1102 is responsible for managing information related to one or more subscription orders received from the customer, maintaining customer data related to the orders, and providing the requested services to the customer. Cloud infrastructure system 1102 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1102 may provide services to multiple customers in parallel. Cloud infrastructure system 1102 may store information for these customers, including possibly proprietary information. In certain examples, cloud infrastructure system 1102 comprises an identity management subsystem (IMS) 1128 that is configured to manage customer information and provide the separation of the managed information such that information related to one customer is not accessible by another customer. IMS 1128 may be configured to provide various security-related services such as identity services, such as information access management, authentication and authorization services, services for managing customer identities and roles and related capabilities, and the like.

Figure 12:
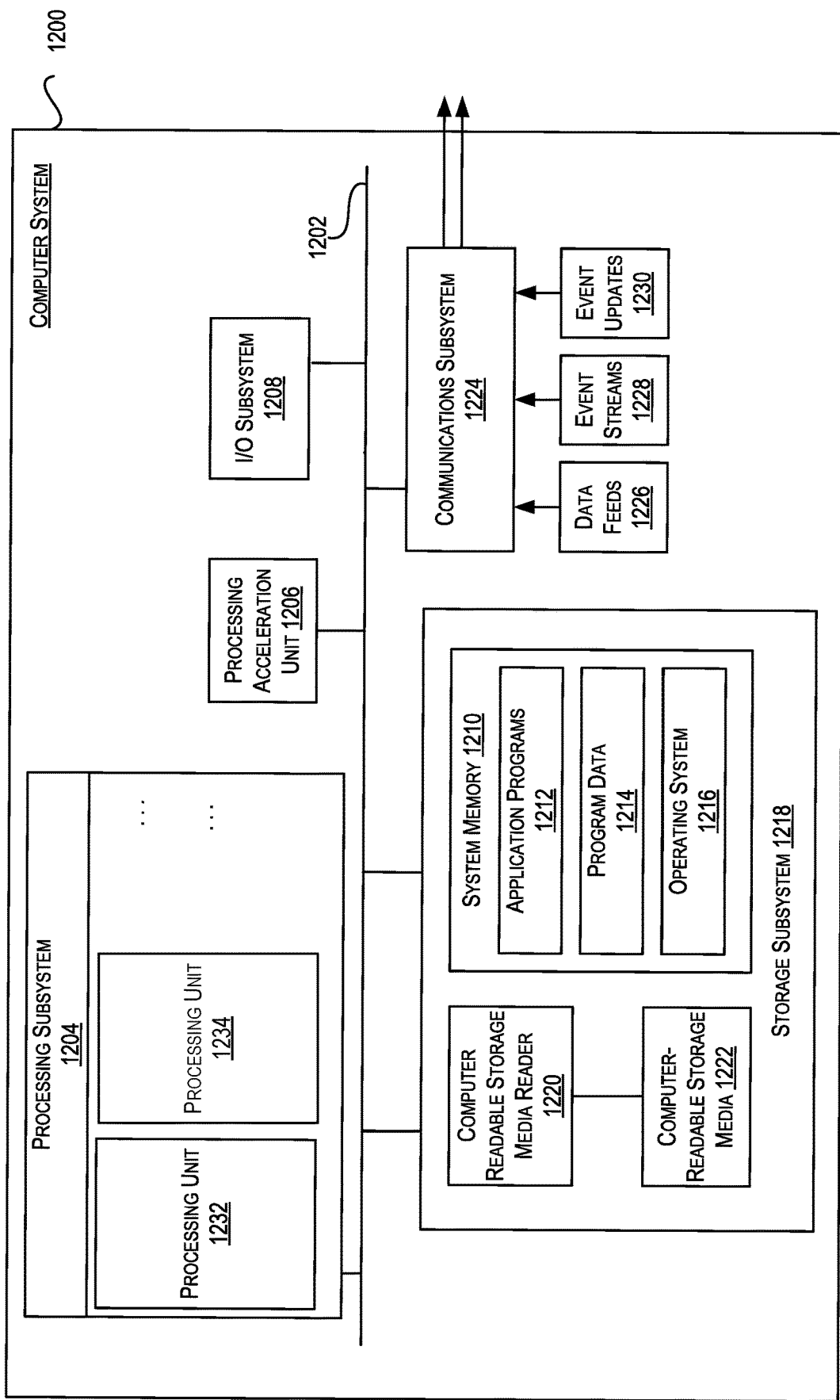
FIG. 12 illustrates an example computer system that may be used to implement various embodiments.

FIG. 12 illustrates an example of computer system 1200. In some examples, computer system 1200 may be used to implement any of the digital assistant or chatbot systems within a distributed environment, and various servers and computer systems described above. As shown in FIG. 12, computer system 1200 includes various subsystems including a processing subsystem 1204 that communicates with a number of other subsystems via a bus subsystem 1202. These other subsystems may include a processing acceleration unit 1206, an I/O subsystem 1208, a storage subsystem 1218, and a communications subsystem 1224. Storage subsystem 1218 may include non-transitory computer-readable storage media including storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative examples of the bus subsystem may utilize multiple buses. Bus subsystem 1202 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1204 controls the operation of computer system 1200 and may comprise one or more processors, application specific integrated circuits (ASICs), or field programmable gate arrays (FPGAs). The processors may include be single core or multicore processors. The processing resources of computer system 1200 may be organized into one or more processing units 1232, 1234, etc. A processing unit may include one or more processors, one or more cores from the same or different processors, a combination of cores and processors, or other combinations of cores and processors. In some examples, processing subsystem 1204 may include one or more special purpose co-processors such as graphics processors, digital signal processors (DSPs), or the like. In some examples, some or all of the processing units of processing subsystem 1204 may be implemented using customized circuits, such as application specific integrated circuits (ASICs), or field programmable gate arrays (FPGAs).

In some examples, the processing units in processing subsystem 1204 may execute instructions stored in system memory 1210 or on computer readable storage media 1222. In various examples, the processing units may execute a variety of programs or code instructions and may maintain multiple concurrently executing programs or processes. At any given time, some or all of the program code to be executed may be resident in system memory 1210 and/or on computer-readable storage media 1222 including potentially on one or more storage devices. Through suitable programming, processing subsystem 1204 may provide various functionalities described above. In instances where computer system 1200 is executing one or more virtual machines, one or more processing units may be allocated to each virtual machine.

In certain examples, a processing acceleration unit 1206 may optionally be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term input device is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1200 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information and data that is used by computer system 1200. Storage subsystem 1218 provides a tangible non-transitory computer-readable storage medium for storing the basic programming and data constructs that provide the functionality of some examples. Storage subsystem 1218 may store software (e.g., programs, code modules, instructions) that when executed by processing subsystem 1204 provides the functionality described above. The software may be executed by one or more processing units of processing subsystem 1204. Storage subsystem 1218 may also provide authentication in accordance with the teachings of this disclosure.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM), dynamic random access memory (DRAM), and the like.

By way of example, and not limitation, as depicted in FIG. 12, system memory 1210 may load application programs 1212 that are being executed, which may include various applications such as Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1222 may store programming and data constructs that provide the functionality of some examples. Computer-readable media 1222 may provide storage of computer-readable instructions, data structures, program modules, and other data for computer system 1200. Software (programs, code modules, instructions) that, when executed by processing subsystem 1204 provides the functionality described above, may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1218 may also include a computer-readable storage media reader 1220 that may further be connected to computer-readable storage media 1222. Reader 1220 may receive and be configured to read data from a memory device such as a disk, a flash drive, etc.

In certain examples, computer system 1200 may support virtualization technologies, including but not limited to virtualization of processing and memory resources. For example, computer system 1200 may provide support for executing one or more virtual machines. In certain examples, computer system 1200 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1200. Accordingly, multiple operating systems may potentially be run concurrently by computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices. For example, when computer system 1200 is used to implement bot system 120 depicted in FIG. 1, the communication subsystem may be used to communicate with a chatbot system selected for an application.

Communication subsystem 1224 may support both wired and/or wireless communication protocols. In certain examples, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1224 may provide wired network connectivity (e.g., Ethernet) in addition to or instead of a wireless interface.

Communication subsystem 1224 may receive and transmit data in various forms. In some examples, in addition to other forms, communications subsystem 1224 may receive input communications in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1224 may be configured to receive data in the form of continuous data streams, which may include event streams 1228 of real-time events and/or event updates 1230, which may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1224 may also be configured to communicate data from computer system 1200 to other computer systems or networks. The data may be communicated in various different forms such as structured and/or unstructured data feeds 1226, event streams 1228, event updates 1230, and the like to one or more databases that may be in communication with one or more streaming data source computers coupled to computer system 1200.

Computer system 1200 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMS, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed:

1. A method comprising:
   receiving, by a query serving system, a request to serve a query for a skillbot, wherein the query serving system comprises: (i) a first plurality of deployments in a serving pool, and (ii) a second plurality of deployments in a free pool, wherein the first plurality of deployments in the serving pool and the second plurality of deployments in the free pool are maintained in a pool of deployments that is different than a training pool of the query serving system;
   determining, by the query serving system, whether a first deployment from the first plurality of deployments in the serving pool can serve the query based on an identifier of the skillbot; and
   in response to determining that the first deployment cannot serve the query,
      selecting, by the query serving system, a second deployment from the second plurality of deployments in the free pool to be assigned to the skillbot;
      loading, by the query serving system, a machine-learning model associated with the skillbot into the second deployment, wherein the machine-learning model is trained to serve the query for the skillbot;
      deleting a third deployment from the first plurality of deployments in the serving pool;

transferring the second deployment from the second plurality of deployments in the free pool to the first plurality of deployments in the serving pool;

serving, by the query serving system, the query using the machine-learning model loaded into the second deployment; and constructing a new deployment to be added to the free pool maintained in the pool of deployments.

2. The method of claim 1, wherein the determining further comprises:

querying a cache to verify whether the identifier of the skillbot is associated with any one deployment of the first plurality of deployments in the serving pool.

3. The method of claim 1, further comprising:

obtaining a number of deployments included in the first plurality of deployments in the serving pool;

comparing the number of deployments to a threshold value of deployments; and re-initializing the first plurality of deployments in the serving pool in response to the number of deployments included in the first plurality of deployments in the serving pool exceeding the threshold value of deployments.

4. The method of claim 3, wherein re-initializing the first plurality of deployments in the serving pool further comprises:

obtaining a timestamp associated with each deployment of the first plurality of deployments in the serving pool, the timestamp corresponding to a time instance the deployment was used to process a prior query; and identifying a deployment of the first plurality of deployments in the serving pool having a lowest timestamp, wherein the deployment having the lowest timestamp corresponds to the third deployment.

5. The method of claim 1, wherein each deployment of the first plurality of deployments in the serving pool and the second plurality of deployments in the free pool includes a serving container and a model manager container hosting a model manager, each deployment of the first plurality of deployments in the serving pool includes a first machine-learning model downloaded in the serving container by the model manager, and wherein each deployment of the second plurality of deployments in the free pool being vacant.

6. The method of claim 1, further comprising:

in response to determining that the first deployment can serve the query, directing, by the query serving system, the query to the first deployment, and executing the machine-learning model loaded in the first deployment to serve the query, wherein a first number of deployments included in the first plurality of deployments in the serving pool is greater than a second number of deployments included in the second plurality of deployments in the free pool.

7. The method of claim 1, wherein the transferring and the constructing causes a cardinality of the free pool to be maintained a constant predetermined level of deployments.

8. A computing device comprising:

a processor; and a memory including instructions that, when executed with the processor, cause the computing device to, at least:

receive a request to serve a query for a skillbot, wherein the computing device comprises: (i) a first plurality of deployments in a serving pool, and (ii) a second plurality of deployments in a free pool, wherein the first plurality of deployments in the serving pool and the second plurality of deployments in the free pool are maintained in a pool of deployments that is different than a training pool of the query serving system;

determine whether a first deployment from the first plurality of deployments in the serving pool can serve the query based on an identifier of the skillbot; and in response to determining that the first deployment cannot serve the query, select a second deployment from the second plurality of deployments in the free pool to be assigned to the skillbot;

load a machine-learning model associated with the skillbot into the second deployment, wherein the machine-learning model is trained to serve the query for the skillbot;

delete a third deployment from the first plurality of deployments in the serving pool;

transfer the second deployment from the second plurality of deployments in the free pool to the first plurality of deployments in the serving pool;

serve the query using the machine-learning model loaded into the second deployment; and construct a new deployment to be added to the free pool maintained in the pool of deployments.

9. The computing device of claim 8, wherein the processor is further configured to query a cache to verify whether the identifier of the skillbot is associated with any one deployment of the first plurality of deployments in the serving pool.

10. The computing device of claim 8, wherein the processor is further configured to:

obtain a number of deployments included in the first plurality of deployments in the serving pool;

compare the number of deployments to a threshold value of deployments; and re-initialize the first plurality of deployments in the serving pool in response to the number of deployments included in the first plurality of deployments in the serving pool exceeding the threshold value of deployments.

11. The computing device of claim 10, wherein the processor is further configured to:

obtain a timestamp associated with each deployment of the first plurality of deployments in the serving pool, the timestamp corresponding to a time instance the deployment was used to process a prior query; and identify a deployment of the first plurality of deployments in the serving pool having a lowest timestamp, wherein the deployment having the lowest timestamp corresponds to the third deployment.

12. The computing device of claim 8, wherein each deployment of the first plurality of deployments in the serving pool and the second plurality of deployments in the free pool includes a serving container and a model manager container hosting a model manager, each deployment of the first plurality of deployments in the serving pool includes a first machine-learning model downloaded in the serving container by the model manager, and wherein each deployment of the second plurality of deployments in the free pool being vacant.

13. The computing device of claim 8, wherein the processor is further configured to:

in response to determining that the first deployment can serve the query, direct the query to the first deployment; and execute the machine-learning model loaded in the first deployment to serve the query, wherein a first number of deployments included in the first plurality of deployments in the serving pool is greater than a second number of deployments included in the second plurality of deployments in the free pool.

14. A non-transitory computer readable medium storing specific computer-executable instructions that, when executed by a processor, cause a a query serving system to at least:
receive a request to serve a query for a skillbot, wherein the query serving system comprises: (i) a first plurality of deployments in a serving pool, and (ii) a second plurality of deployments in a free pool, wherein the first plurality of deployments in the serving pool and the second plurality of deployments in the free pool are maintained in a pool of deployments that is different than a training pool of the query serving system;
determine whether a first deployment from the first plurality of deployments in the serving pool can serve the query based on an identifier of the skillbot; and
in response to determining that the first deployment cannot serve the query,
select a second deployment from the second plurality of deployments in the free pool to be assigned to the skillbot;
load a machine-learning model associated with the skillbot into the second deployment, wherein the machine-learning model is trained to serve the query for the skillbot;
delete a third deployment from the first plurality of deployments in the serving pool;
transfer the second deployment from the second plurality of deployments in the free pool to the first plurality of deployments in the serving pool;
serve the query using the machine-learning model loaded into the second deployment; and
construct a new deployment to be added to the free pool maintained in the pool of deployments.

15. The non-transitory computer readable medium storing specific computer-executable instructions of claim 14, wherein the query serving system is further configured to:
obtain a number of deployments included in the first plurality of deployments in the serving pool;
compare the number of deployments to a threshold value of deployments; and
re-initialize the first plurality of deployments in the serving pool in response to the number of deployments included in the first plurality of deployments in the serving pool exceeding the threshold value of deployments.

16. The non-transitory computer readable medium storing specific computer-executable instructions of claim 15, wherein the query serving system is further configured to:
obtain a timestamp associated with each deployment of the first plurality of deployments in the serving pool, the timestamp corresponding to a time instance the deployment was used to process a prior query;
identify a deployment of the first plurality of deployments in the serving pool having a lowest timestamp, wherein the deployment having the lowest timestamp corresponds to the third deployment.

17. The non-transitory computer readable medium storing specific computer-executable instructions of claim 14, wherein each deployment of the first plurality of deployments in the serving pool and the second plurality of deployments in the free pool includes a serving container and a model manager container hosting a model manager, each deployment of the first plurality of deployments in the serving pool includes a first machine-learning model downloaded in the serving container by the model manager, and wherein each deployment of the second plurality of deployments in the free pool being vacant.

18. The non-transitory computer readable medium storing specific computer-executable instructions of claim 14, wherein the query serving system is further configured to:
in response to determining that the first deployment can serve the query, direct the query to the first deployment; and
execute the machine-learning model loaded in the first deployment to serve the query, wherein a first number of deployments included in the first plurality of deployments in the serving pool is greater than a second number of deployments included in the second plurality of deployments in the free pool.

* * * * *

UNITED STATES PATENT AND TRADEMARK OFFICE
CERTIFICATE OF CORRECTION

PATENT NO. : 12,169,763 B2
APPLICATION NO. : 17/229228
DATED : December 17, 2024
INVENTOR(S) : Vishnoi et al.

It is certified that error appears in the above-identified patent and that said Letters Patent is hereby corrected as shown below:

In the Specification

In Column 14, Line 8, delete "and and" and insert -- and --, therefor.

In Column 16, Line 24, delete "and and" and insert -- and --, therefor.

In Column 20, Line 12, delete "serving serving" and insert -- serving --, therefor.

In Column 27, Line 13, delete "Internet" and insert -- Internetwork --, therefor.

In Column 33, Line 62, delete "Xbox" and insert -- Xbox® --, therefor.

In Column 38, Lines 22-23, delete "RAMS, EPROMS," and insert -- RAMs, EPROMs, --, therefor.

In the Claims

In Column 41, Line 9, in Claim 14, delete "cause a a" and insert -- cause a --, therefor.

Signed and Sealed this
First Day of April, 2025

Coke Morgan Stewart
*Acting Director of the United States Patent and Trademark Office*